US010051672B2

(12) United States Patent
Nakayama

(10) Patent No.: US 10,051,672 B2
(45) Date of Patent: Aug. 14, 2018

(54) INFORMATION PROCESSING DEVICE, INFORMATION PROCESSING METHOD, AND PROGRAM

(71) Applicant: Sony Corporation, Tokyo (JP)

(72) Inventor: Tetsunori Nakayama, Tokyo (JP)

(73) Assignee: Sony Corporation, Tokyo (JP)

( * ) Notice: Subject to any disclaimer, the term of this patent is extended or adjusted under 35 U.S.C. 154(b) by 72 days.

(21) Appl. No.: 15/112,249

(22) PCT Filed: Feb. 24, 2015

(86) PCT No.: PCT/JP2015/055285
§ 371 (c)(1),
(2) Date: Jul. 18, 2016

(87) PCT Pub. No.: WO2015/159588
PCT Pub. Date: Oct. 22, 2015

(65) Prior Publication Data
US 2016/0345367 A1   Nov. 24, 2016

(30) Foreign Application Priority Data

Apr. 14, 2014   (JP) ................................. 2014-082674

(51) Int. Cl.
*H04W 76/10*   (2018.01)
*H04N 5/232*   (2006.01)
(Continued)

(52) U.S. Cl.
CPC ........ *H04W 76/10* (2018.02); *G06F 13/4022* (2013.01); *H04M 1/7253* (2013.01);
(Continued)

(58) Field of Classification Search
CPC ..... H04W 8/20; H04W 76/02; H04W 76/045; H04W 84/12; H04W 84/20; H04M 1/7253; H04N 5/232; G06F 13/00; G05F 13/4022
See application file for complete search history.

(56) References Cited

U.S. PATENT DOCUMENTS

2008/0311852 A1* 12/2008 Hansen ................. H04W 88/06
455/41.2
2010/0272083 A1* 10/2010 Itoh ....................... H04W 84/20
370/338
(Continued)

FOREIGN PATENT DOCUMENTS

JP   10-224772 A   8/1998
JP   2011-045026 A   3/2011
(Continued)

OTHER PUBLICATIONS

European Patent Office Search Report for EP15779836; dated Oct. 31, 2017 (Year: 2017).*
(Continued)

*Primary Examiner* — Benjamin H Elliott, IV
(74) *Attorney, Agent, or Firm* — Michael Best & Friedrich LLP

(57) ABSTRACT

[Object] To propose an information processing device, an information processing method, and a program through which it is possible to easily switch a connection mode in an external device having a function of switching a connection mode.
[Solution] An information processing device includes a control unit configured to, in a communication form in which a plurality of slave units are connected to one master unit through a wireless communication channel, instruct an external device to switch a mode from one mode to the other mode between a first mode in which an operation of the
(Continued)

master unit is performed and a second mode in which an operation of the slave unit is performed, and an acquisition unit configured to acquire information indicating a connection state between the external device and a connection destination of the external device according to switching of the mode.

17 Claims, 23 Drawing Sheets

(51) Int. Cl.
*H04W 8/20* (2009.01)
*H04W 84/12* (2009.01)
*G06F 13/40* (2006.01)
*H04M 1/725* (2006.01)
*H04W 76/25* (2018.01)
*H04W 84/20* (2009.01)

(52) U.S. Cl.
CPC ......... *H04N 5/232* (2013.01); *H04N 5/23206* (2013.01); *H04N 5/23245* (2013.01); *H04W 8/20* (2013.01); *H04W 84/12* (2013.01); *H04W 76/25* (2018.02); *H04W 84/20* (2013.01)

(56) References Cited

U.S. PATENT DOCUMENTS

| | | | |
|---|---|---|---|
| 2011/0205971 A1* | 8/2011 | Ito | H04W 88/06 370/328 |
| 2014/0028435 A1* | 1/2014 | Brockway, III | H04N 1/00315 340/3.1 |
| 2016/0345367 A1* | 11/2016 | Nakayama | G06F 13/00 |

FOREIGN PATENT DOCUMENTS

| | | |
|---|---|---|
| JP | 2012-156726 A | 8/2012 |
| JP | 2013-085050 A | 5/2013 |
| JP | 2013-223193 A | 10/2013 |
| JP | 2014-010608 A | 1/2014 |

OTHER PUBLICATIONS

International Search Report for PCT/JP2015/055285; dated Oct. 18, 2016 (Year: 2016).*

* cited by examiner

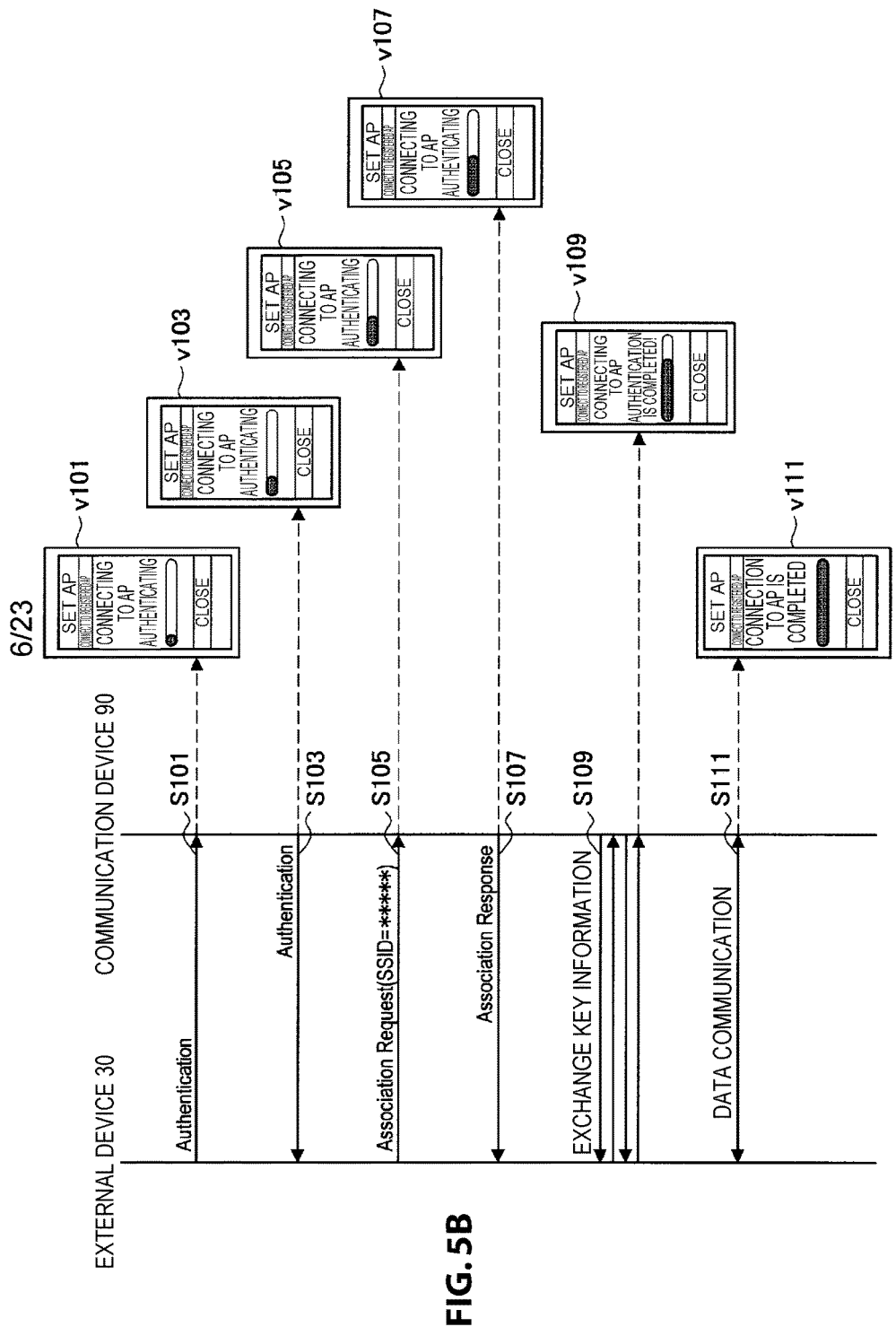

INFORMATION PROCESSING DEVICE, INFORMATION PROCESSING METHOD, AND PROGRAM

TECHNICAL FIELD

The present disclosure relates to an information processing device, an information processing method, and a program.

BACKGROUND ART

Some devices, such as a digital camera and a television device, can be connected to an information processing device such as a smartphone via a wireless network. Communication standards for connecting different devices via a wireless network in this manner include, for example, Wireless Fidelity (Wi-Fi) (registered trademark), Bluetooth (registered trademark), and ZigBee (registered trademark).

In addition, in recent years, functions of connecting an information processing device and an external device such as a digital camera via a network and thus manipulating the external device through the information processing device have been provided. With the provision of such functions, some external devices having a limited (for example, simplified or deleted) input and output interface are provided.

CITATION LIST

Patent Literature

Patent Literature 1: JP H10-224772B

SUMMARY OF INVENTION

Technical Problem

Communication forms in which different devices are connected via a wireless network are not limited to a communication form in which one device and the other device are connected in one-to-one correspondence, but may include, for example, a communication form in which a plurality of other devices (slave units) are connected to one device (a master unit) (that is, a one-to-many communication form). Therefore, for example, an external device such as a digital camera has a connection mode that is switched between a connection mode in which an operation of a master unit is performed and a connection mode in which an operation of a slave unit is performed, and thus can switch a communication form related to a connection with other devices.

Some external devices have a limited input and output interface, and it is preferable that a communication form of an external communication device be switched more easily.

Therefore, the present disclosure proposes an information processing device, an information processing method, and a program which are novel and improved and through which it is possible to easily switch a connection mode in an external device having a function of switching a connection mode.

Solution to Problem

According to the present disclosure, there is provided an information processing device including: a control unit configured to, in a communication form in which a plurality of slave units are connected to one master unit through a wireless communication channel, instruct an external device to switch a mode from one mode to the other mode between a first mode in which an operation of the master unit is performed and a second mode in which an operation of the slave unit is performed; and an acquisition unit configured to acquire information indicating a connection state between the external device and a connection destination of the external device according to switching of the mode.

In addition, according to the present disclosure, there is provided an information processing device including: a control unit configured to, in a communication form in which a plurality of slave units are connected to one master unit through a wireless communication channel, switch a mode from one mode to the other mode between a first mode in which an operation of the master unit is performed and a second mode in which an operation of the slave unit is performed based on an instruction from an external device, and a notification unit configured to notify the external device of information indicating a connection state with a new connection destination according to switching of the mode.

In addition, according to the present disclosure, there is provided an information processing method including: instructing, by a processor, in a communication form in which a plurality of slave units are connected to one master unit through a wireless communication channel, an external device to switch a mode from one mode to the other mode between a first mode in which an operation of the master unit is performed and a second mode in which an operation of the slave unit is performed; and acquiring information indicating a connection state between the external device and a connection destination of the external device according to switching of the mode.

In addition, according to the present disclosure, there is provided an information processing method including: switching, by a processor, in a communication form in which a plurality of slave units are connected to one master unit through a wireless communication channel, a mode from one mode to the other mode between a first mode in which an operation of the master unit is performed and a second mode in which an operation of the slave unit is performed based on an instruction from an external device; and notifying the external device of information indicating a connection state with a new connection destination according to switching of the mode.

In addition, according to the present disclosure, there is provided a program causing a computer to execute: instructing, in a communication form in which a plurality of slave units are connected to one master unit through a wireless communication channel, an external device to switch a mode from one mode to the other mode between a first mode in which an operation of the master unit is performed and a second mode in which an operation of the slave unit is performed; and acquiring information indicating a connection state between the external device and a connection destination of the external device according to switching of the mode.

In addition, according to the present disclosure, there is provided a program causing a computer to execute: switching, in a communication form in which a plurality of slave units are connected to one master unit through a wireless communication channel, a mode from one mode to the other mode between a first mode in which an operation of the master unit is performed and a second mode in which an operation of the slave unit is performed based on an instruction from an external device; and notifying the external device of information indicating a connection state with a new connection destination according to switching of the mode.

Advantageous Effects of Invention

According to the present disclosure described above, there are provided an information processing device, an information processing method, and a program through which it is possible to easily switch a connection mode in an external device having a function of switching a connection mode.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 5B is an explanatory diagram for describing a flow of a series of processes in the information processing system according to the same embodiment and examples of information that is presented to the information processing device according to progress of the process.

DESCRIPTION OF EMBODIMENT(S)

Figure 1:
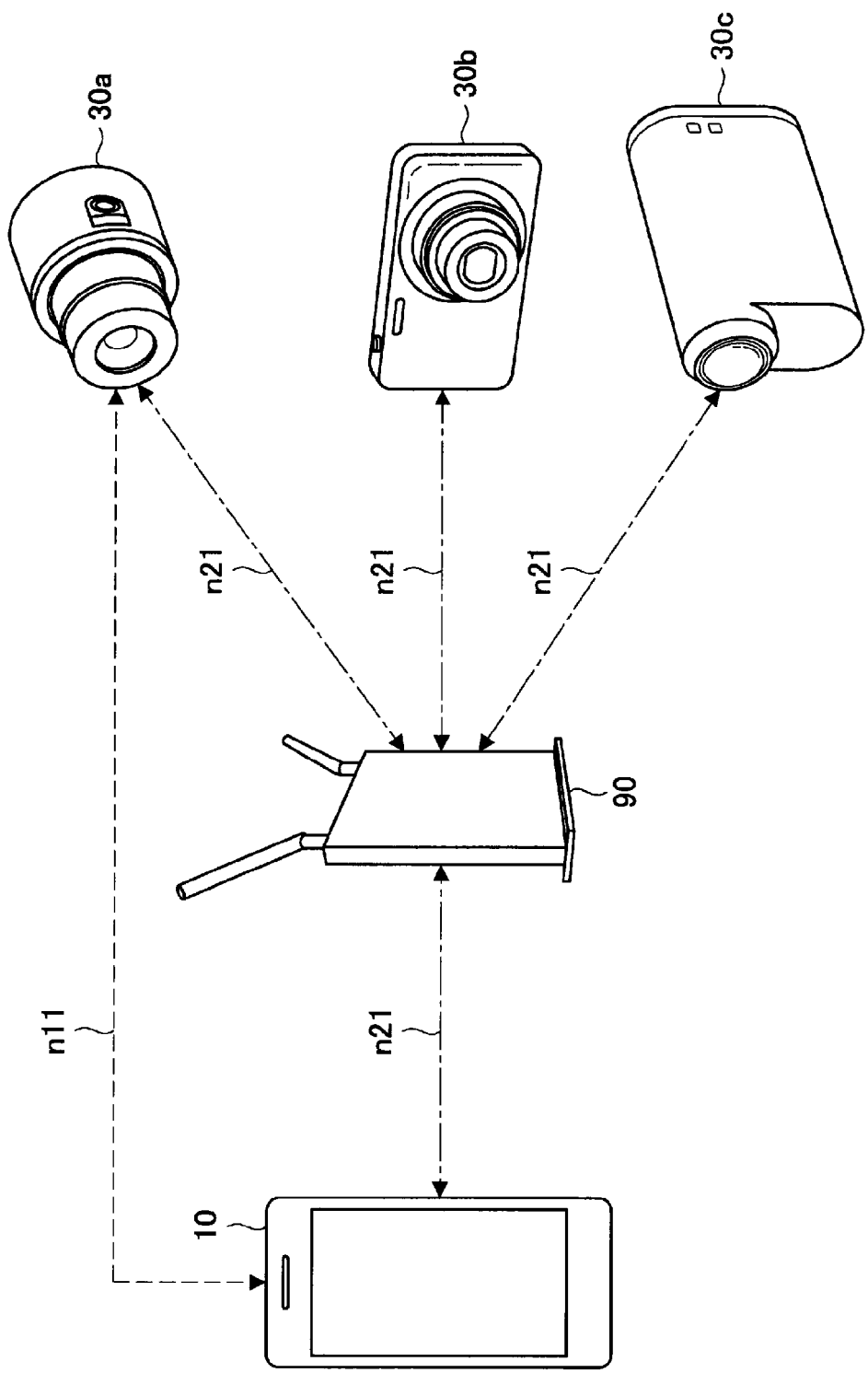
FIG. 1 is an explanatory diagram for describing an example of a schematic system configuration of an information processing system according to an embodiment according to a first embodiment of the present disclosure.

Hereinafter, (a) preferred embodiment(s) of the present disclosure will be described in detail with reference to the appended drawings. In this specification and the drawings, elements that have substantially the same function and structure are denoted with the same reference signs, and repeated explanation is omitted.

The description will proceed in the following order.
1. First Embodiment
1.1. Overview
1.2. Functional configuration
1.3. Switching from a single connection mode to a multi-connection mode
1.3.1. State transition
1.3.2. Processes
1.4. Switching from a multiconnection mode to a single connection mode
1.5. Modification 1-1: when a WPS-PBC is used
1.5.1. State transition
1.5.2. Processes
1.6. Modification 1-2: when a user input is also performed
1.7. Summary
2. Second Embodiment
2.1. Overview
2.2. Functional configuration 2.3. Processes
2.4. Summary
3. Third Embodiment
3.1. Overview
3.2. Functional configuration
3.3. Processes
3.4. Modification 2: when a WPS-PBC is used
3.5. Summary
4. Hardware configuration
5. Summary <1. First Embodiment>
[1.1. Overview]

First, a schematic system configuration of an information processing system according to the first embodiment of the present disclosure will be described with reference to FIG. 1, and tasks of the information processing system according to the present embodiment will be arranged. FIG. 1 is a schematic explanatory diagram for describing an example of a system configuration of the information processing system according to the present embodiment.

As shown in FIG. 1, the information processing system according to the present embodiment includes, for example, an information processing device 10, external devices 30a to 30c, and a communication device 90. The information processing device 10 corresponds to a user terminal such as a so-called smartphone. In addition, the external devices 30a to 30c correspond to, for example, external devices such as digital cameras, and can communicate with the information processing device 10 via a wireless network. When the external devices 30a to 30c are not particularly distinguished, they will be described below as "the external device 30."

In addition, the communication device 90 indicates a communication device that relays communication between the information processing device 10 and the external device 30, for example, a router.

In particular, the information processing device 10 according to the present embodiment can control operations of the external device 30 that is connected via a network through the network. As a specific example, when the external device 30 is a digital camera, a user can instruct the external device 30 to capture an image such as a moving image or a still image through the information processing device 10. In this case, the information processing device 10 may control operations of the external device 30 through the communication device 90. This function may be implemented by, for example, installing an application that is created using an application programming interface (API) for controlling operations of the external device 30 in the information processing device 10 via a network. That is, the information processing device 10 controls operations of the external device 30 using the API. More specifically, the information processing device 10 transmits control information to the external device 30 and thus controls operations of the external device 30. For example, when the external device 30 is a digital camera, such control information includes an instruction to image in the external device 30, transmitting an image of a subject before capturing to the information processing device 10 (that is, a display of a live view), transmitting setting information of the external device 30 to the information processing device 10 (that is, acquisition of a setting value), and changing setting information of the external device 30 (that is, changing a setting value).

In this manner, when the information processing device 10 can control operations of the external device 30 via a network, devices whose input and output interfaces are limited (for example, simplified or deleted) can be used as the external device 30. For example, the external device 30a shown in FIG. 1 is an example of a lens type imaging device that is mainly specialized in an imaging lens part, has no viewfinder and monitor, and enables, for example, the user to image at any angle by hand. In addition, the external device 30c shown in FIG. 1 is an example of a downsized, lightweight, and robust (for example waterproof, dustproof, shock resistant, or low-temperature resistant) imaging device that is adhered to a helmet or tool when a sport (such as cycling, running, snowboarding, skiing, driving, surfing, or diving) is performed and can image scenery appearing during the sport with a sense of realism without requiring the use of hands. In addition, such new style cameras, the external devices 30a and 30c, are downsized and lightweight, and thus a manipulation display unit is simplified or removed. Therefore, manipulations such as image control and setting change are assumed to be performed by the information processing device 10 that functions as a remote controller. A housing of the external devices 30a and 30c can be fixed to a human body, a tool or another object such as an information processing terminal, for example, a smartphone, using the housing itself or an external attachment (not shown). For example, the external devices 30a and 30c may include a wearable camera. As indicated by the reference sign 30b in FIG. 1, the external device may be a digital camera including a manipulation display unit such as a manipulation button or a touch panel (not shown). In addition, the external device 30 is not limited to the digital camera and can be any device that is operated via a network.

In addition, in the information processing system according to the present embodiment, as shown in FIG. 1, the information processing device 10 and the external device 30 can switch between a communication form in which connection is directly performed in one-to-one correspondence, and a communication form in which connection is performed through the communication device 90. A network between the information processing device 10 and the external device 30 in a communication form in which the information processing device 10 and the external device 30 are directly connected in one-to-one correspondence may be referred below to as a "network n11." In addition, a network among the information processing device 10, the external device 30, and the communication device 90 in a communication form in which the information processing device 10 and the external device 30 are connected through the communication device 90 may be referred to as a "network n21."

For example, when the information processing device 10 and the external device 30a are connected in one-to-one correspondence via the network n11, the information processing device 10 can instruct the external device 30a to capture an image via the network n11. In addition, when the information processing device 10 and the external devices 30a to 30c are connected via the network n21 (that is, through the communication device 90), the information processing device 10 can instruct the external devices 30a to 30c to capture an image at the same time (or individually) via the network n21. That is, in the information processing system according to the present embodiment, the information processing device 10 and the external devices 30 may be configured such that a communication form between the information processing device 10 and the external device 30 is switched and thus a manipulation mode of each of the external devices 30 is switched via a network.

The networks n11 and n21 may include, for example, a wireless transmission path for connecting different devices. As a specific example of the networks n11 and n21, networks based on communication standards such as Wi-Fi (registered trademark), Bluetooth (registered trademark), and ZigBee (registered trademark) may be exemplified.

Hereinafter, an example in which, when a communication form between the information processing device 10 and the external device 30 is switched, a communication scheme in which at least one device that is operated as a slave unit ST (a so-called station) can be connected to a device that is operated as a master unit AP (a so-called access point) is used as in a network based on the Wi-Fi (registered trademark) standard will be described.

For example, as in the communication form via the network n11, in a communication form in which the information processing device 10 and the external device 30 are directly connected in one-to-one correspondence, any of the information processing device 10 and the external device 30 serves as the master unit AP and the other serves as the slave unit ST. As a specific example, when the external device 30 serves as the master unit AP and receives a connection request from the information processing device 10 serving as the slave unit ST, the information processing device 10 and the external device 30 are connected via the network n11. It is needless to say that the information processing device 10 may serve as the master unit AP.

In addition, as in the communication form via the network n21, in a communication form in which the information processing device 10 and the external device 30 are connected through the communication device 90, the communication device 90 serves as the master unit AP, and the information processing device 10 and the external device 30 serve as the slave units STs.

In this case, when the communication device 90 serving as the master unit AP receives a connection request of the information processing device 10 and the external device 30 serving as the slave units STs, the information processing device 10, the external device 30, and the communication device 90 are connected via the network n21. In the communication form via the network n21, since the communication device 90 serves as the master unit AP, as shown in FIG. 1, the information processing device 10 and the plurality of external devices 30a to 30c can be connected through the communication device 90.

In this manner, a mechanism in which switching of a connection mode between the information processing device 10 and the external device 30, in other words, switching of a connection mode (a mode in which an operation of the master unit AP or the slave unit ST is performed) of the external device 30 can be performed based on a manipulation through the information processing device 10 is necessary. In particular, when the external device 30 has a limited input and output interface, a method of a user checking a result or progress of a process is limited. Therefore, when the connection mode is switched, it is difficult to check progress and a result of a process according to switching in some cases. Accordingly, in a scene in which the external device 30 is used, in particular, a mechanism in which a connection mode of the external device 30 can be switched based on a manipulation from the information processing device 10 is preferable.

However, when a connection mode of the external device 30 is switched, communication between the external device 30 and the information processing device 10 may be disconnected.

As a specific example, in FIG. 1, the external device 30 operated as the master unit AP and the information processing device 10 operated as the slave unit ST are assumed to be directly connected in one-to-one correspondence via the network n11. From this state, a connection mode of the external device 30 is changed from a mode in which the external device 30 set as the master unit AP receives a connection from the slave unit ST (that is, a mode in which an operation of the master unit AP is performed) to a mode in which the external device 30 set as the slave unit ST is connected to the master unit AP (that is, a mode in which an operation of the slave unit ST is performed). Therefore, the external device 30 is connected to the communication device 90 operated as the master unit AP.

In this case, when the external device 30 receives an instruction to switch a connection mode from the information processing device 10, the network n11 is disconnected, the connection mode is switched to a mode in which an operation of the slave unit is performed, and then the external device 30 set as the slave unit ST is connected to the communication device 90 serving as the master unit AP. Here, after the network n11 is disconnected, the information processing device 10 has difficulty using the network n11 as a propagation path for acquiring information from the external device 30. Therefore, for example, even if a process of switching a connection mode has failed on the external device 30 side, it is difficult to check the failure of the process on the information processing device 10 side. In particular, when a device having a limited input and output interface is used as the external device 30, the above-described effect is more remarkable.

Figure 2:
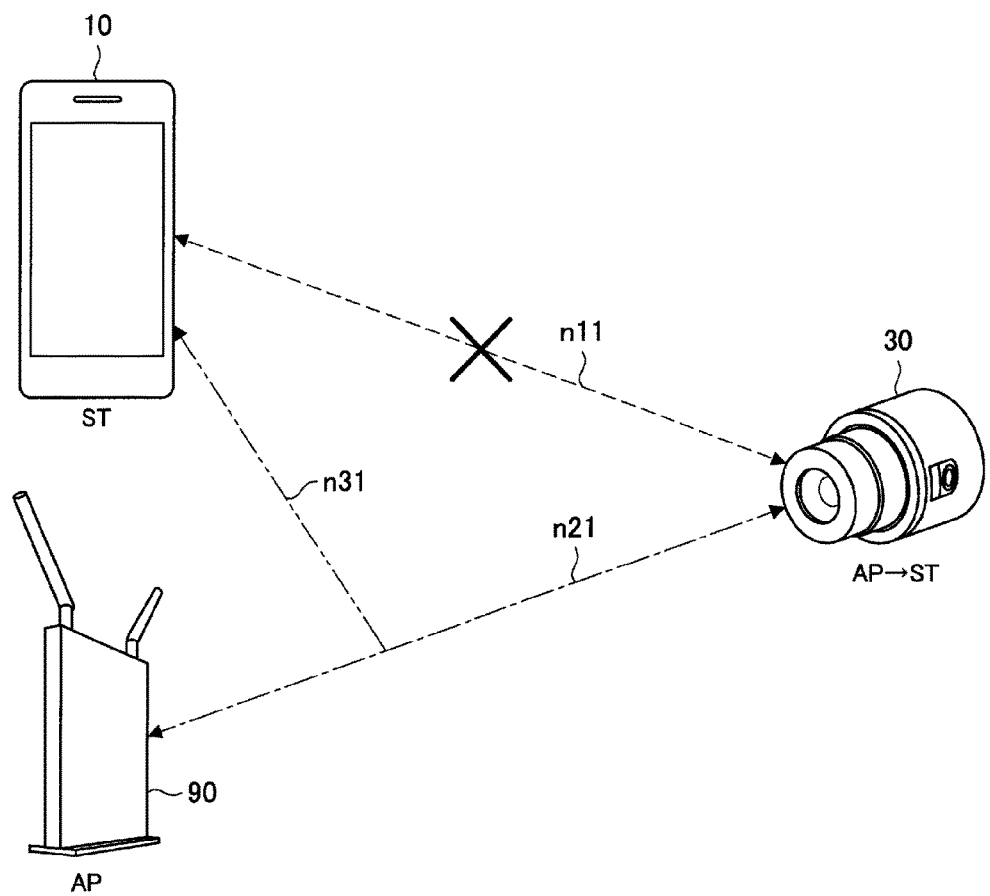
FIG. 2 is a schematic explanatory diagram for describing operations of the information processing system according to the same embodiment.

Therefore, in the information processing system according to the present embodiment, in order to address the above-described problems, a mechanism in which, even in an external device having a limited input and output interface, progress and a result of the process of switching a connection mode can be easily checked is provided. Hereinafter, schematic operations of the information processing system according to the present embodiment will be described with reference to FIG. 2, focusing on a connection relation among the information processing device 10, the external device 30 and the communication device 90. FIG. 2 is a schematic explanatory diagram for describing operations of the information processing system according to the present embodiment.

The example in FIG. 2 shows a case in which, based on an instruction to switch a connection mode from the information processing device 10, the external device 30 switches a mode in which an operation of the master unit AP is performed to a mode in which an operation of the slave unit ST is performed, and thus the external device 30 as the slave unit ST is connected to the communication device 90. Hereinafter, a mode in which the external device 30 is operated as the master unit AP and thus is connected to the information processing device 10 via the network n11 may be referred to as a "single connection mode." In addition, a mode in which the external device 30 is operated as the slave unit ST, is connected to the communication device 90 serving as the master unit AP via the network n21, and thus is connected to the information processing device 10 through the communication device 90 may be referred to as a "multiconnection mode."

As shown in FIG. 2, when the network n11 is disconnected according to switching of a connection mode of the external device 30, the information processing device 10 according to the present embodiment acquires (intercepts) data that is transmitted via a wireless network as indicated by the reference sign n31. Then, the information processing device 10 extracts data related to communication between the external device 30 and the communication device 90 from the intercepted data.

Specifically, before the network n11 is disconnected, the information processing device 10 acquires identification information for identifying the external device 30 from the external device 30 in advance. Then, the information processing device 10 acquires data that is transmitted via a wireless network, and extracts data including identification information of the external device 30 from the acquired data. As an example of data that may be included in data that is transmitted via a wireless network and that is identification information for identifying the external device 30, a media access control (MAC) address is exemplified.

In addition, when the external device 30 has been connected to the communication device 90 before, control information (for example, a channel and a service set identifier (SSID) of wireless communication) for connection to the communication device 90 may be stored. Therefore, before the network n11 is disconnected, the information processing device 10 acquires control information for connection to the communication device 90 from the external device 30, and may extract data including the control information acquired in advance from data that is transmitted via a wireless network.

In such a configuration, the information processing device 10 can extract data that is transmitted and received between the external device 30 and the communication device 90 from various types of data that are transmitted via a wireless network.

When data that is transmitted and received between the external device 30 and the communication device 90 is extracted, the information processing device 10 analyzes content of the data and recognizes progress and a result of the process of switching a connection mode of the external device 30. It is needless to say that, in order to implement this process, it is necessary for the information processing device 10 to recognize a data structure of data that is transmitted and received when communication is established between the external device 30 and the communication device 90 in advance.

As a specific example, when the network n21 is a network based on the Wi-Fi (registered trademark) standard, the information processing device 10 can recognize progress of the process of switching a connection mode of the external device 30 according to which procedure is performed among procedures (communication protocols) defined in Wi-Fi. Examples of the procedures defined in Wi-Fi include "Authentication," "Association Request," "Association Response," and exchange of key information.

In addition, after communication between the external device 30 and the communication device 90 is established, quality of service (QoS) data and the like are transmitted and received between the external device 30 and the communication device 90. Therefore, when the data that is transmitted and received between the external device 30 and the communication device 90 is extracted, the information processing device 10 can recognize that the process of switching a connection mode in the external device 30 is successful.

As described above, the information processing device 10 can acquire control information indicating a connection state between the external device 30 and the communication device 90 based on a method different from communication via the network n11. In such a configuration, even when the network n11 is disconnected according to switching of a connection mode of the external device 30, the information processing device 10 can recognize progress and a result of the process of switching a connection mode. Therefore, in the information processing system according to the present embodiment, even when the external device 30 having a limited input and output interface is used, it is possible to present progress and a result of the process of switching a connection mode of the external device 30 to the user through the information processing device 10.

As described above, a function of instructing the external device 30 to capture an image via a network and a function of instructing the external device 30 to switch a connection mode via a network may be provided as the API described above. That is, when an application created using the API is installed in the information processing device 10, the information processing device 10 can instruct the external device 30 to capture an image and can instruct the external device 30 to switch a connection mode via a network, which was described above.

The overview of the information processing system according to the present embodiment has been described above with reference to FIG. 1 and FIG. 2. The information processing system according to the present embodiment will be described below in further detail. In this description, while a case in which a so-called smartphone is used as the information processing device 10 is exemplified, the information processing device 10 is not necessarily limited to the smartphone as long as it can control operations of the external device 30 via a network. As a specific example, the information processing device 10 may be a terminal or a controller in which a function of controlling operations of the external device 30 via a network is mounted in advance (for example, pre-installed).

[1.2. Functional Configuration]

Figure 3:
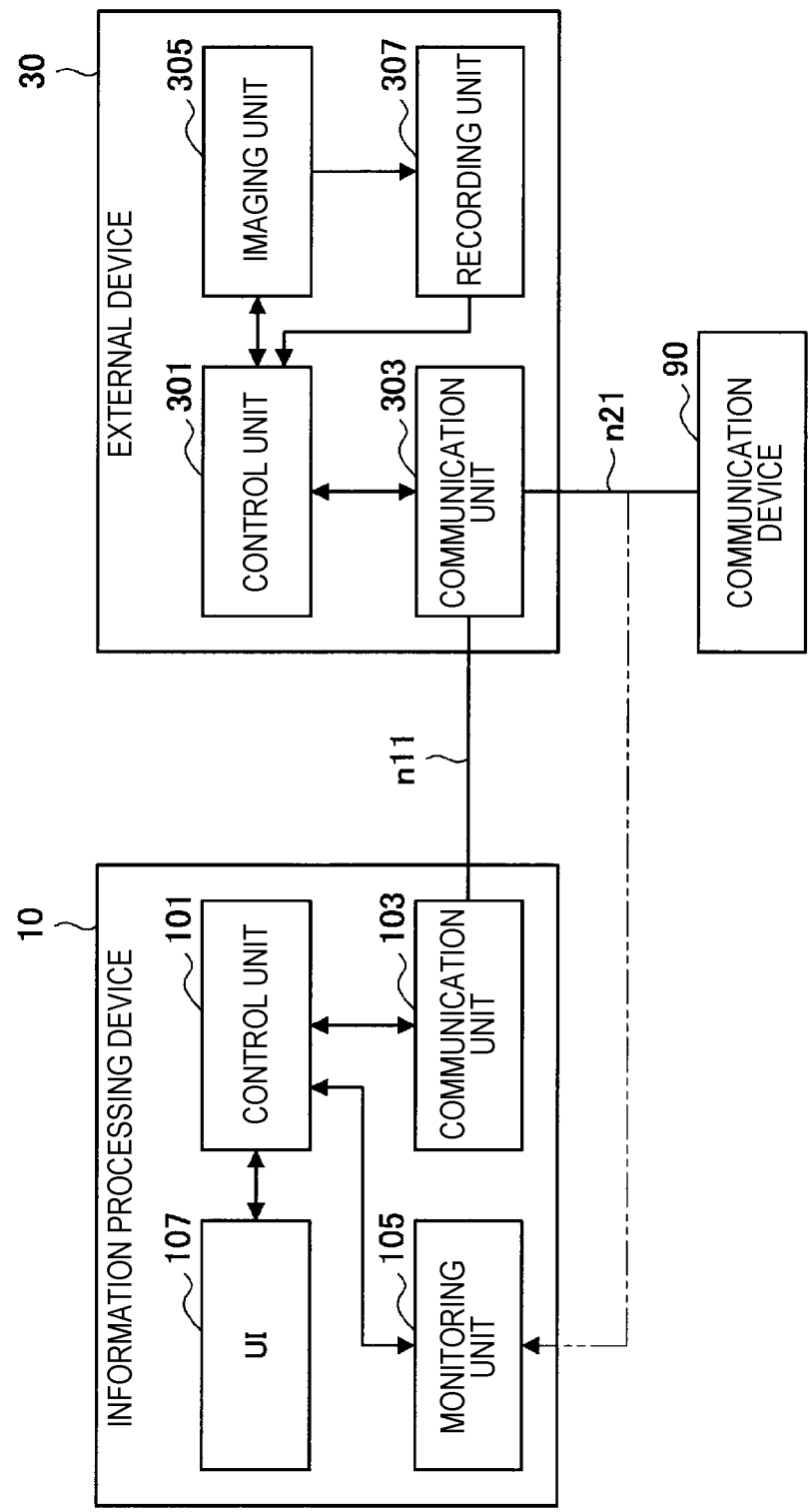
FIG. 3 is an explanatory diagram for describing an example of a functional configuration of the information processing system according to the same embodiment.

An example of a functional configuration of the information processing system according to the present embodiment will be described with reference to FIG. 3, and particularly, focusing on a function of switching a communication form in the information processing device 10 and the external device 30. FIG. 3 is an explanatory diagram for describing an example of a functional configuration of the information processing system according to the present embodiment. This description will proceed focusing on a case in which the information processing device 10 instructs the external device 30 operated in the single connection mode to switch to the multiconnection mode and thus the external device 30 set as the slave unit ST is connected to the communication device 90 operated as the master unit AP As shown in FIG. 3, the information processing device 10 includes a control unit 101, a communication unit 103, a monitoring unit 105, and a UI 107. In addition, the external device 30 includes a control unit 301 and a communication unit 303. In addition, the external device 30 may include an imaging unit 305 and a recording unit 307. The configurations included in the information processing device 10 described above may be implemented by a hardware circuit of the information processing device 10. Similarly, the configurations included in the external device 30 described above may be implemented by a hardware circuit of the external device 30.

The communication unit 303 is a communication interface for configurations within the external device 30 to communicate with the information processing device 10 and the communication device 90 via the networks n11 and n21, respectively. Hereinafter, when the configurations within the external device 30 transmit and receive data to and from the information processing device 10 or the communication device 90, the data is assumed to be transmitted and received through the communication unit 303 even if there is no particular description.

The imaging unit 305 captures an image such as a still image or a moving image of a subject based on an instruction from the control unit 301 to be described below. The imaging unit 305 may record the captured image in the recording unit 307. In addition, the imaging unit 305 may directly output the captured image to the control unit 301.

In addition, the imaging unit 305 captures a so-called through image based on the instruction from the control unit 301 and sequentially outputs the captured through image to the control unit 301.

The recording unit 307 is a recording medium for recording the captured image. The recording unit 307 may include a recording medium built in the external device 30. In addition, the recording unit 307 may include an external recording medium that is removable from the external device 30.

The control unit 301 controls operations for the external device 30 to communicate with another device such as the information processing device 10 or the communication device 90. The control unit 301 can receive an instruction output through a predetermined API from the information processing device 10 connected via the network n11.

For example, the control unit 301 may instruct the imaging unit 305 to capture an image or acquire a through image based on an instruction from the information processing device 10 output through the API.

As a specific example, when an instruction to capture an image is received from the information processing device 10 connected via the network n11, the control unit 301 causes the imaging unit 305 to capture an image based on the instruction. In this case, the control unit 301 may acquire the captured image from the imaging unit 305 and output the acquired image to the information processing device 10 via the network n11.

In addition, based on the instruction from the information processing device 10 connected via the network n11, the control unit 301 may read a previously captured image from the recording unit 307 and output the read image to the information processing device 10 via the network n11.

In addition, when an instruction to output a through image is received from the information processing device 10 connected via the network n11, the control unit 301 causes the imaging unit 305 to capture a through image based on the instruction. Then, the control unit 301 sequentially acquires the captured through image from the imaging unit 305, and outputs the acquired through image to the information processing device 10 via the network n11.

In addition, based on the instruction from the information processing device 10 output through the API, the control unit 301 according to the present embodiment performs a process of switching a connection mode and switching a connection destination according to switching of the connection mode.

In addition, based on the instruction from the information processing device 10, the control unit 301 outputs the identification information for identifying the external device 30 to the information processing device 10 via the network n11. The control unit 301 may acquire the identification information for identifying the external device 30 based on, for example, a system call of an operating system (OS) that controls various operations of the external device 30. It is needless to say that a method of the control unit 301 acquiring the identification information is not particularly limited as long as it is possible to acquire the identification information for identifying the external device 30.

In addition, based on the instruction from the information processing device 10, the control unit 301 may output control information for connection to the communication device 90 serving as a connection destination to the information processing device 10 via the network n11. As a specific example, when the external device 30 has been connected to the communication device 90 before, control information (for example, a channel or an SSID of wireless communication) for connection to the communication device 90 may be stored in the external device 30. Therefore, the control unit 301 may read control information for connection to the communication device 90 that is stored in the external device 30 and output the read control information to the information processing device 10 via the network n11.

The communication unit 103 is a communication interface for configurations within the information processing device 10 to communicate with the external device 30 via the network n11. Hereinafter, when the configurations within the information processing device 10 transmit and receive data to and from the external device 30, the data is transmitted and received through the communication unit 103 even if there is no particular description.

The UI 107 is a user interface for the user to manipulate the information processing device 10. The UI 107 may include, for example, an output device for the information processing device 10 to present information to the user such as a display. In addition, the UI 107 may include an input device for the user to manipulate the information processing device 10, for example, a button or a touch panel.

Based on an instruction from the control unit 101, the monitoring unit 105 sequentially extracts data including identification information of the external device 30 from data that is transmitted via a wireless network and outputs the extracted data to the control unit 101.

Specifically, the monitoring unit 105 acquires the identification information for identifying the external device 30 from the control unit 101 in advance. The monitoring unit 105 receives an instruction from the control unit 101, sequentially acquires (intercepts) data that is transmitted via a wireless network including the network n21, and extracts data including identification information of the external device 30 from the acquired data. Then, the monitoring unit 105 sequentially outputs the extracted data, that is, the data including identification information of the external device 30, to the control unit 101.

In addition, the monitoring unit 105 acquires control information for the external device 30 to connect to the communication device 90 (for example, a channel or an SSID of wireless communication) from the control unit 101, and may extract data including the control information from data that is transmitted via a wireless network. The monitoring unit 105 corresponds to an example of an "acquisition unit" according to the present embodiment.

The control unit 101 can control operations of the external device 30 connected via the network n11. As a specific example, the control unit 101 executes an application created based on an API for manipulating the external device 30 via a network and thus controls operations of the external device 30.

As a specific example, based on an instruction from the user through the UI 107, the control unit 101 may instruct the external device 30 to capture an image via the network n11. In this case, the control unit 101 may acquire the captured image from the external device 30 via the network n11 in response to the instruction. In addition, the control unit 101 may present the image acquired from the external device 30 to the user through the UI 107.

In addition, based on an instruction from the user through the UI 107, the control unit 101 may instruct the external device 30 to output an image (that is, a previously captured image) recorded by the external device 30 via the network n11. In this case, the control unit 101 may acquire an image whose output is instructed from the external device 30 via the network n11 in response to the instruction. In addition, the control unit 101 may present the image acquired from the external device 30 to the user through the UI 107.

In addition, based on an instruction from the user through the UI 107, the control unit 101 may instruct the external device 30 to output an image via the network n11. In this case, the control unit 101 sequentially acquires the captured through image from the external device 30 via the network n11 in response to the instruction. Then, the control unit 101 may sequentially present the acquired through image to the user through the UI 107.

In addition, based on an instruction from the user through the UI 107, the control unit 101 according to the present embodiment instructs the external device 30 to switch a connection mode via the network n11. Operations of the control unit 101 related to switching a connection mode of the external device 30 will be described below.

The control unit 101 acquires the identification information for identifying the external device 30 from the external device 30 connected via the network n11 in advance. In addition, the control unit 101 may acquire control information for connection to the communication device 90 that is a connection destination of the external device 30 in advance.

A timing at which the control unit 101 acquires the above-described identification information or control information from the external device 30 is not particularly limited as long as the network n11 has not yet been disconnected. For example, when the control unit 101 is connected to the external device 30 via the network n11, identification information or control information may be acquired. In addition, as another example, when the control unit 101 instructs the external device 30 to switch a connection mode, the identification information or control information may be acquired before the network n11 is disconnected.

When an instruction to switch a connection mode of the external device 30 is received from the user through the UI 107, the control unit 101 instructs the external device 30 to switch a connection mode via the network n11. In this case, the control unit 101 acquires control information for the external device 30 to establish communication with the communication device 90 such as an SSID, a password, and a PIN from the user through the UI 107 and may notify the external device 30 of the control information.

When an instruction to switch a connection mode is received, the external device 30 disconnects the network n11, switches the connection mode, and starts a process in which the external device 30 set as the slave unit ST is connected to the communication device 90 operated as the master unit AP.

When the network n11 is disconnected, the control unit 101 outputs the identification information for identifying the external device 30 to the monitoring unit 105, and instructs the monitoring unit 105 to monitor a state of communication between the external device 30 and the communication device 90 that is a connection destination of the external device 30. In this case, the control unit 101 may output control information for the external device 30 to connect to the communication device 90 to the monitoring unit 105.

Then, the control unit 101 analyzes content of data that is sequentially output from the monitoring unit 105, and thus recognizes progress and a result of the process of switching a connection mode of the external device 30. Specifically, the control unit 101 specifies which procedure is performed among procedures defined in the standard of a network that connects the external device 30 and the communication device 90 from the analysis result of the content of the data output from the monitoring unit 105. Then, the control unit 101 recognizes progress of the process of switching a connection mode of the external device 30, that is, which procedures have been completed so far, according to the specified procedure.

In addition, after communication is established between the external device 30 and the communication device 90, quality of service (QoS) data and the like are transmitted and received between the external device 30 and the communication device 90. Therefore, when the data that is transmitted and received between the external device 30 and the communication device 90 is extracted, the control unit 101 can recognize that the process of switching a connection mode in the external device 30 is successful. In this manner, when data transmitted and received after communication is established between the external device 30 and the communication device 90 is detected, the control unit 101 may recognize that the process of switching a connection mode in the external device 30 is successful.

As described above, the control unit 101 acquires control information indicating a connection state between the external device 30 and the communication device 90 and recognizes progress and a result of the process of switching a connection mode of the external device 30 based on the control information. Then, the control unit 101 presents the recognized progress and result of the process to the user through the UI 107.

When the external device 30 operated in the multiconnection mode is instructed to switch to the single connection mode, the control unit 101 is connected to the communication device 90 via the network n21 and may instruct the external device 30 to switch a connection mode through the communication device 90. In addition, when the mode is switched to the single connection mode, after the network n21 is disconnected, the information processing device 10 and the external device 30 are connected via the network n11. Therefore, the control unit 101 may acquire progress and a result of the process of switching a connection mode from the external device 30 via the network n11.

The example of the functional configuration of the information processing system according to the present embodiment has been described above with reference to FIG. 3.

[1.3. Switching from a Single Connection Mode to a Multiconnection Mode]

Next, operations of the information processing system according to the present embodiment when a connection mode of the external device 30 is switched from the single connection mode to the multiconnection mode will be described. In this description, an example in which the external device 30 switches the mode from the single connection mode to the multiconnection mode based on the instruction from the information processing device 10, and thus the external device 30 set as the slave unit ST is connected to the communication device 90 operated as the master unit AP will be described. In addition, in this description, a case in which the external device 30 is connected to the communication device 90 to which the external device 30 has been connected before based on previously registered control information (for example, an SSID and a password) will be described.

<<1.3.1. State Transition>>

Figure 4:
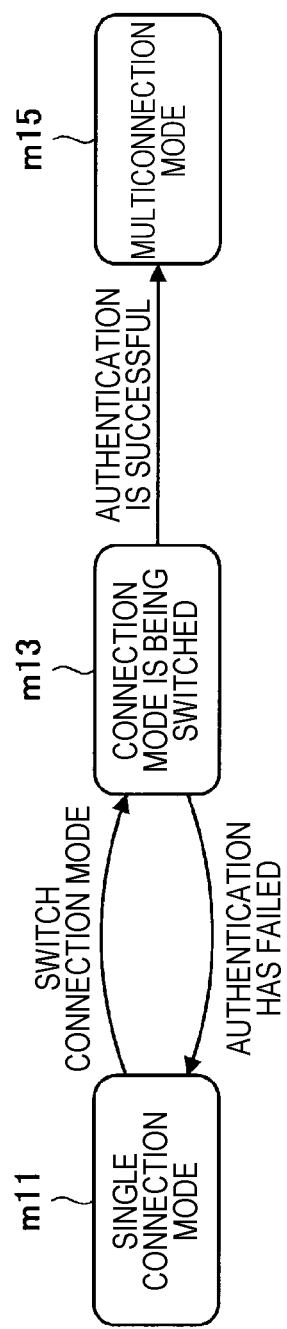
FIG. 4 is a state transition diagram schematically showing an example of a state transition of an external device according to the same embodiment.

First, a state transition of the external device 30 when the single connection mode is switched to the multiconnection mode will be described with reference to FIG. 4. FIG. 4 is a state transition diagram schematically showing an example of a state transition of the external device 30 according to the present embodiment, and shows a state transition when the mode is switched from the single connection mode to the multiconnection mode.

As shown in FIG. 4, the external device 30 according to the present embodiment may have states indicated by reference signs m11 to m15. The state m11 indicates a state in which the external device 30 is operated in the single connection mode. In addition, the state m15 indicates a state in which the external device 30 is operated in the multiconnection mode. In addition, the state m13 indicates a state in which a connection mode is being switched, that is, a state in which the process of switching a connection mode is being performed.

In the state m11 in which the external device 30 is operated in the single connection mode, when an instruction to switch to the multiconnection mode is received from the information processing device 10, the external device 30 transitions to the state m13 indicating that the connection mode is being switched.

When the state transitions to the state m13, the external device 30 disconnects communication with the information processing device 10 and the external device 30 set as the slave unit ST accesses the communication device 90 operated as the master unit AP. Then, the external device 30 transmits control information used when the external device 30 was connected to the communication device 90 before and performs an authentication process for establishing communication with the communication device 90 based on the control information. In addition, while the external device 30 remains in the state m13, the information processing device 10 monitors a state of communication between the external device 30 and the communication device 90, and presents progress of the process of switching a connection mode of the external device 30 to the user according to the communication state.

When authentication with the communication device 90 is successful, the external device 30 transitions to the state m15 in which an operation is performed in the multiconnection mode. On the other hand, when authentication with the communication device 90 has failed, the external device 30 transitions to the state m11 in which an operation is performed in the single connection mode again. In addition, when the state transitions to the state m11 or the state m15, the information processing device 10 presents the result of the process of switching a connection mode of the external device 30 to the user based on a state of communication between the external device 30 and the communication device 90.

When the external device 30 includes an informing device configured to inform the user of an own state, the external device 30 may inform the user of progress and a result of the process of switching a connection mode through the informing device. Examples of the informing device include a speaker configured to output acoustic information and a light emission device (for example, a light emitting diode (LED)) configured to present information using a lighting or blinking pattern. In addition, when the state transitions to the state m11 in which an operation is performed in the single connection mode again, the external device 30 may establish communication with the information processing device 10 again.

The state transition of the external device 30 when the mode is switched from the single connection mode to the multiconnection mode has been described above with reference to FIG. 4.

<<1.3.2. Processes>>

Figure 5A:
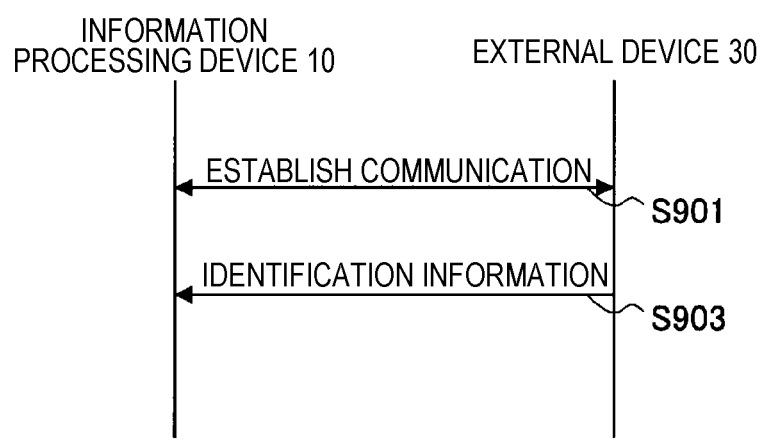
FIG. 5A is an explanatory diagram for describing an example of a flow of a series of processes in the information processing system according to the same embodiment.
Figure 6:
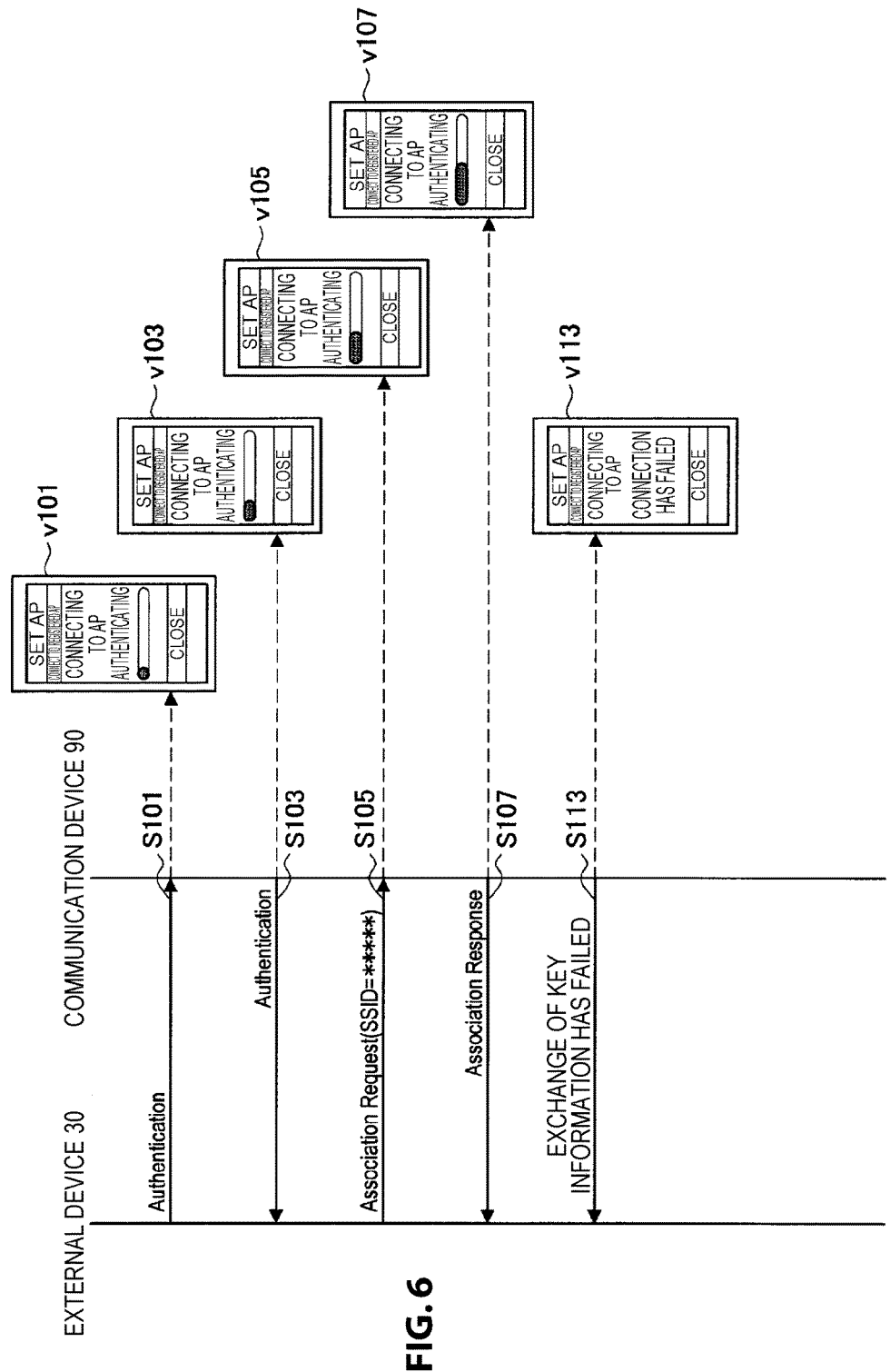
FIG. 6 is an explanatory diagram for describing a flow of a series of processes in the information processing system according to the same embodiment and examples of information presented to the information processing device according to progress of the process.

Next, a flow of a series of processes (communication sequences) between the external device 30 and the communication device 90 when the mode is switched from the single connection mode to the multiconnection mode and examples of information presented to the information processing device 10 according to progress of the process will be described with reference to FIG. 5A, FIG. 5B, and FIG. 6. FIG. 5A is a diagram for describing a flow of a series of processes in the information processing system according to the present embodiment and shows a flow of a series of processes for the information processing device 10 to acquire identification information of the external device 30 from the external device 30. In addition, FIG. 5B and FIG. 6 are explanatory diagrams for describing a flow of a series of processes in the information processing system according to the present embodiment and examples of information presented to the information processing device 10 according to progress of the process. FIG. 5B and FIG. 6 show examples in which, based on the Wi-Fi standard, as communication sequences when connection is established between the external device 30 and the communication device 90, an SSID and a password are used to establish communication.

First, a flow of processes of the information processing device 10 acquiring identification information from the external device 30 in advance in order to instruct the external device 30 to switch a connection mode will be described with reference to FIG. 5A.

(Step S901)

First, when communication with the external device 30 is not established, the information processing device 10 establishes communication with the external device 30. Accordingly, the information processing device 10 and the external device 30 are connected via the network n11.

(Step S903)

Next, the information processing device 10 acquires the identification information for identifying the external device 30 from the external device 30 connected via the network n11. In this case, the information processing device 10 may acquire control information for connection to the communication device 90 that is a connection destination of the external device 30 in advance.

As described above, in order to instruct the external device 30 to switch a connection mode, the information processing device 10 acquires the identification information for identifying the external device 30 in advance. As will be described in detail below, based on the identification information acquired described above, the information processing device 10 can recognize progress and a result of the process of switching a connection mode of the external device 30.

Next, an example of a flow of a series of processes of an information processing system when authentication between the external device 30 and the communication device 90 is successful and connection is established between the external device 30 and the communication device 90 will be described with reference to FIG. 5B.

As shown in FIG. 5B, when communication is established between the external device 30 and the communication device 90, the communication is established mainly through procedures indicated by reference signs S101 to S109.

Specifically, as indicated by the reference signs S101 and S103, an authentication procedure called "Authentication" is performed between the external device 30 and the communication device 90. When procedures indicated by the reference signs S101 and S103 are completed, as indicated by a reference sign S105, the external device 30 transmits "Association Request" to the communication device 90 based on an SSID and a password that are designated in advance (for example, those used previously for connection to the communication device 90). The communication device 90 receives "Association Request," and performs authentication based on the password that is transmitted from the external device 30. When the authentication is successful, as indicated by a reference sign S107, the external device 30 is notified of "Association Response."

When the external device 30 is notified of "Association Response," as indicated by the reference sign S109, key information is exchanged between the external device 30 and the communication device 90. When the key information is successfully exchanged, communication is established between the external device 30 and the communication device 90.

Then, when communication is established between the external device 30 and the communication device 90, as indicated by a reference sign S111, data communication between the external device 30 and the communication device 90 starts.

As described above, when a connection mode of the external device 30 is switched from the single connection mode to the multiconnection mode, the procedures S101 to S109 are performed in order. When the procedures S101 to S109 are completed, data communication indicated by the reference sign S111 starts.

The information processing device 10 according to the present embodiment associates information items v101 to v109 presented to the user with the procedures S101 to S109, respectively, in advance. For example, in the example shown in FIG. 5B, the information processing device 10 causes the information items v101 to v109 to be displayed on an output device such as a display serving as a display screen, and presents the information items v101 to v109 to the user.

In addition, the information processing device 10 sequentially extracts data that is transmitted and received between the external device 30 and the communication device 90 from data that is transmitted via a wireless network, analyzes the extracted data, and recognizes a connection state between the external device 30 and the communication device 90. Specifically, based on the analysis result of the extracted data, the information processing device 10 specifies which procedure among the procedures S101 to S109 the data indicates. Then, the information processing device 10 presents information corresponding to the specified procedure among the information items v101 to v109 to the user.

In addition, the information processing device 10 analyzes the extracted data, as indicated by the reference sign S111, and when a state in which data communication between the external device 30 and the communication device 90 starts is detected, recognizes that switching of a connection mode of the external device 30 has been successfully completed. In this case, the information processing device 10 presents an information item v111 indicating that the switching of a connection mode of the external device 30 has been successfully completed to the user.

When authentication between the external device 30 and the communication device 90 has failed, the information processing device 10 can detect that the authentication has failed based on data of which one side notifies the other side between the external device 30 and the communication device 90 when the authentication has failed.

For example, FIG. 6 shows an example of a flow of a series of processes of an information processing system when authentication between the external device 30 and the communication device 90 has failed and connection is not established between the external device 30 and the communication device 90. In the example shown in FIG. 6, an example when the procedure S109 of exchanging key information among the procedures S101 to S109 in FIG. 5B has failed is shown.

Specifically, the information processing device 10 recognizes that authentication between the external device 30 and the communication device 90 has failed based on data regarding a procedure in which failure of exchanging key information is notified of, as indicated by a reference sign S113. In this case, the information processing device 10 presents an information item v113 indicating that the switching of a connection mode of the external device 30 is abnormally terminated to the user.

In such a configuration, when a connection mode of the external device 30 is switched from the single connection mode to the multiconnection mode, the information processing system according to the present embodiment can present progress and a result of the process of switching to the user through the information processing device 10.

[1.4. Switching from a Multiconnection Mode to a Single Connection Mode]

Figure 7:
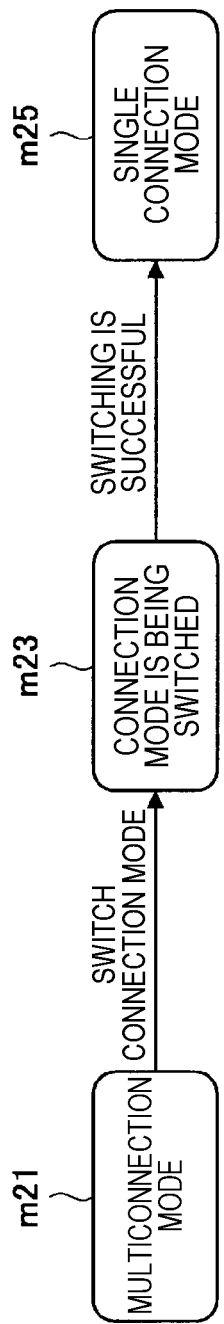
FIG. 7 is a state transition diagram schematically showing an example of a state transition of the external device according to the same embodiment.

Next, operations of the information processing system according to the present embodiment when a connection mode of the external device 30 is switched from the multiconnection mode to the single connection mode will be described with reference to FIG. 7. FIG. 7 shows a state transition diagram schematically showing an example of a state transition of the external device 30 according to the present embodiment, and shows a state transition when the mode is switched from the multiconnection mode to the single connection mode. In this description, an example in which the external device 30 switches the mode from the multiconnection mode to the single connection mode based on the instruction from the information processing device 10 and disconnects connection with the communication device 90, and the external device 30 set as the master unit AP receives a connection request from the information processing device 10 will be described.

As shown in FIG. 7, the external device 30 according to the present embodiment may have states indicated by reference signs m21 to m25. The state m21 indicates a state in which the external device 30 is operated in the multiconnection mode. In addition, the state m25 indicates a state in which the external device 30 is operated in the single connection mode. In addition, the state m23 indicates a state in which a connection mode is being switched, that is, a state in which the process of switching a connection mode is being performed.

In the state m21 in which an operation is performed in the multiconnection mode, when an instruction to switch to the single connection mode is received from the information processing device 10 through the communication device 90, the external device 30 transitions to the state m23 in which a connection mode is being switched. When the state transitions to the state m23, the external device 30 disconnects communication with the communication device 90, and the external device 30 set as the master unit AP receives a connection request from the information processing device 10. Then, the external device 30 performs an authentication process for establishing communication with the information processing device 10 based on a connection request from the information processing device 10.

Then, when authentication with the information processing device 10 is successful, the external device 30 transitions to the state m25 in which an operation is performed in the single connection mode.

While the external device 30 remains in the states m23 and m25, the information processing device 10 directly communicates with the external device 30 and performs an authentication process. Therefore, the information processing device 10 itself can recognize a course of the authentication process and may present progress and a result of the process of switching a connection mode of the external device 30 to the user according to the progress and the result of the authentication process.

Operations of the information processing system according to the present embodiment when a connection mode of the external device 30 is switched from the multiconnection mode to the single connection mode have been described above with reference to FIG. 7.

[1.5. Modification 1-1: When a WPS-PBC is Used]

Next, as Modification 1-1, operations of the information processing system according to the present embodiment when the external device 30 set as the slave unit ST is connected to the communication device 90 operated as the master unit AP using a technique called a Wi-Fi protected setup-push button configuration (WPS-PBC) will be described.

<<1.5.1. State Transition>>

Figure 8:
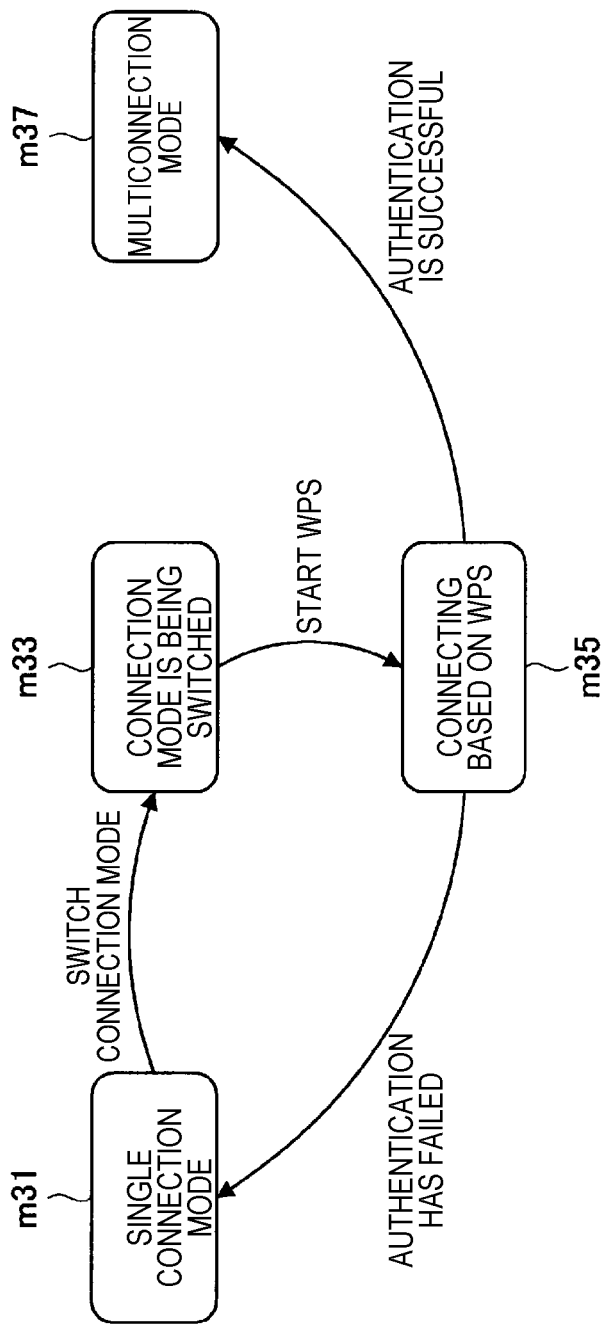
FIG. 8 is a state transition diagram schematically showing an example of a state transition of an external device according to Modification 1-1.

First, a state transition of the external device 30 when the mode is switched from the single connection mode to the multiconnection mode using the WPS-PBC will be described with reference to FIG. 8. FIG. 8 is a state transition diagram schematically showing an example of a state transition of the external device 30 according to Modification 1-1, and shows a state transition when the mode is switched from the single connection mode to the multiconnection mode using the WPS-PBC.

As shown in FIG. 8, the external device 30 according to the present embodiment may have states indicated by reference signs m31 to m37. The state m31 indicates a state in which the external device 30 is operated in the single connection mode. In addition, the state m37 indicates a state in which the external device 30 is operated in the multiconnection mode.

In addition, the state m33 indicates a state in which a connection mode is being switched, that is, a state in which the process of switching a connection mode is being performed. In addition, the state m35 indicates that an authentication procedure is being performed based on the WPS-PBC.

In the state m31 in which an operation is performed in the single connection mode, when an instruction to switch to the multiconnection mode is received from the information processing device 10 based on the WPS-PBC, the external device 30 transitions to the state m33 indicating that the connection mode is being switched. When the state transitions to the state m33, the external device 30 disconnects communication with the information processing device 10, and the mode is switched from the mode in which an operation of the master unit AP is performed to the mode in which an operation of the slave unit ST is performed.

When switching to the mode in which an operation of the slave unit ST is performed is completed, the external device 30 transitions to the state m35 and searches for a connectable communication device. Then, the external device 30 performs an authentication process with each connectable communication device based on the WPS standard. In this case, for example, when a communication device whose manipulation button for establishing communication based on the WPS-PBC scheme is pressed is within a communication range of the external device 30, the external device 30 can perform an authentication process with the communication device and establish communication.

In addition, while the external device 30 remains in the states m33 and m35, the information processing device 10 monitors a state of communication between the external device 30 and the communication device 90, and presents progress of the process of switching a connection mode of the external device 30 to the user according to the communication state.

When authentication with the communication device 90 is successful, the external device 30 transitions to the state m37 in which an operation is performed in the multiconnection mode.

On the other hand, when authentication with the communication device 90 has failed (for example, when a communication device capable of establishing communication based on the WPS-PBC scheme is not detected), the external device 30 transitions to the state m31 in which an operation is performed in the single connection mode again. In this case, the information processing device 10 presents the result of the process of switching a connection mode of the external device 30 to the user based on a state of communication between the external device 30 and the communication device 90. In addition, when the state transitions to the state m31 in which an operation is performed in the single connection mode again, the external device 30 may establish communication with the information processing device 10 again.

The state transition of the external device 30 when the mode is switched from the single connection mode to the multiconnection mode has been described above with reference to FIG. 8. When the external device 30 includes an informing device configured to inform the user of an own state, the external device 30 may inform the user of progress and a result of the process of switching a connection mode through the informing device, which is the same as the example shown in FIG. 4.

<<1.5.2. Processes>>

Figure 9:
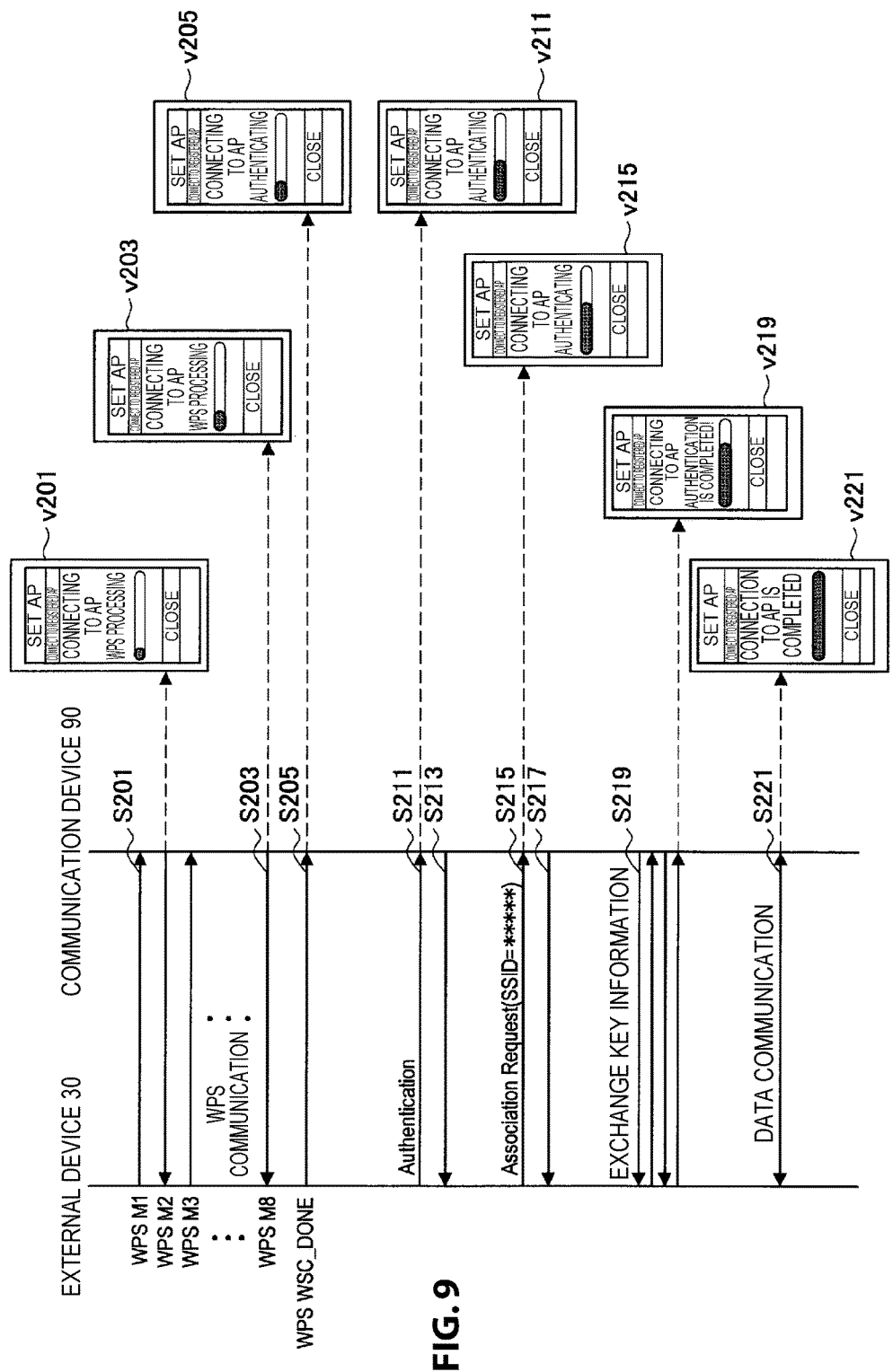
FIG. 9 is an explanatory diagram for describing a flow of a series of processes in an information processing system according to Modification 1-1 and examples of information presented to an information processing device 10 according to progress of the process.

Next, a flow of a series of processes (communication sequences) between the external device 30 and the communication device 90 when the mode is switched from the single connection mode to the multiconnection mode and examples of information presented to the information processing device 10 according to progress of the process will be described with reference to FIG. 9. FIG. 9 is an explanatory diagram for describing a flow of a series of processes in an information processing system according to Modification 1-1 and examples of information presented to the information processing device 10 according to progress of the process. FIG. 9 shows an example of communication sequences when communication is established between the external device 30 and the communication device 90 based on the WPS-PBC scheme.

When communication is established between the external device 30 and the communication device 90 based on the WPS-PBC scheme, as indicated by reference signs S201 to S205 in FIG. 9, an authentication process is performed based on the WPS standard, which is different from the example shown in FIG. 5B.

Specifically, in the example shown in FIG. 9, when the communication device 90 that can perform communication based on the WPS is detected, the external device 30 performs an authentication process with the communication device 90 based on the WPS standard, as indicated by the reference signs S201 to S205. Then, when the authentication process based on the WPS standard is successful, the external device 30 acquires control information for connection to the communication device 90 from the communication device 90 as the result of the authentication process.

The following processes are the same as those in the example shown in FIG. 5B. In FIG. 9, procedures indicated by reference signs 5211 to S221 correspond to the procedures indicated by the reference signs S101 to S111 in FIG. 5B.

That is, as indicated by the reference signs 5211 and 5213, an authentication procedure called "Authentication" is performed between the external device 30 and the communication device 90. Next, as indicated by the reference sign 5215, the external device 30 transmits "Association Request" to the communication device 90. In this case, the external device 30 transmits control information acquired when the authentication process is performed based on the WPS standard to the communication device 90. The communication device 90 receives "Association Request" and performs authentication based on the control information transmitted from the external device 30, and when the authentication is successful, notifies the external device 30 of "Association Response" as indicated by the reference sign S217.

When the external device 30 is notified of "Association Response," as indicated by the reference sign S219, key information is exchanged between the external device 30 and the communication device 90, and when exchange of the key information is successful, communication is established between the external device 30 and the communication device 90.

Then, when communication is established between the external device 30 and the communication device 90, as indicated by the reference sign S221, data communication between the external device 30 and the communication device 90 starts.

As described above, the procedures S201 to S219 are performed in order. When the procedures S201 to S219 are completed, data communication indicated by the reference sign S221 starts.

As in the example described based on FIG. 5B, the information processing device 10 according to the present embodiment associates information items v201 to v219 presented to the user with the procedures S201 to S219, respectively, in advance. For example, in the example shown in FIG. 9, the information processing device 10 causes the information items v201 to v219 to be displayed on an output device such as a display serving as a display screen, and presents the information items v201 to v219 to the user.

Then, the information processing device 10 acquires (intercepts) and analyzes data that is transmitted and received via a wireless network, and thus specifies a connection state between the external device 30 and the communication device 90, that is, which procedure among the procedures S201 to S219 is performed. Then, the information processing device 10 presents information corresponding to the specified procedure among the information items v201 to v219 to the user.

In addition, the information processing device 10 analyzes the extracted data, and thus recognizes that switching of a connection mode of the external device 30 is successfully completed when a state in which data communication between the external device 30 and the communication device 90 starts is detected, as indicated by the reference sign S221. In this case, the information processing device 10 presents an information item v221 indicating that the switching of a connection mode of the external device 30 has been successfully completed to the user.

On the other hand, when authentication between the external device 30 and the communication device 90 has failed, as in the example shown in FIG. 5B, when the authentication has failed, the information processing device 10 may detect that the authentication has failed based on data of which one side notifies the other side between the external device 30 and the communication device 90.

In such a configuration, the information processing system according to the present embodiment can present progress and a result of the process of switching to the user through the information processing device 10 even when a connection mode of the external device 30 is switched based on the WPS-PBC scheme.

[1.6. Modification 1-2: When a User Input is Also Performed]

Next, an information processing system according to Modification 1-2 will be described. In the above-described embodiment, an example in which the external device 30 is connected to the communication device 90 to which the external device 30 has been connected before based on previously registered control information (for example, an SSID and a password) will be described with reference to FIG. 4 to FIG. 6. On the other hand, when the user instructs the external device 30 to switch a connection mode through the information processing device 10, control information for the external device 30 to connect to the communication device 90 may be designated.

Figure 10:
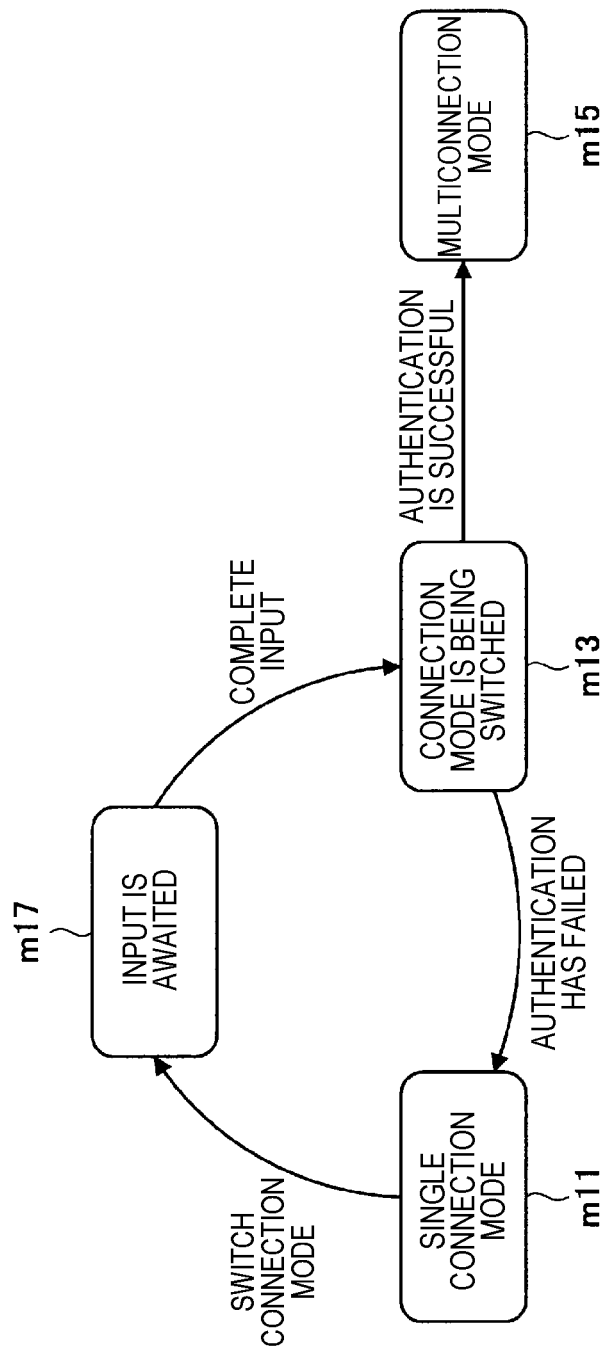
FIG. 10 is a state transition diagram schematically showing an example of a state transition of an external device 30 according to Modification 1-2.

Therefore, in Modification 1-2, a case in which, when a connection mode of the external device 30 is switched, the user designates control information for the external device 30 to connect to the communication device 90 will be described with reference to FIG. 10, focusing on operations of the external device 30. FIG. 10 is a state transition diagram schematically showing an example of a state transition of the external device 30 according to Modification 1-2 and shows a state transition when the mode is switched from the single connection mode to the multiconnection mode. The example shown in FIG. 10 shows an example when an operation is performed such that the user can designate control information for the external device 30 to connect to the communication device 90 in the above example described based on FIG. 4.

The example shown in FIG. 10 is different from the example shown in FIG. 4 in that a state m17 in which an input from the user is awaited is included That is, in the state m11 in which an operation is performed in the single connection mode, when an instruction to switch to the multiconnection mode is received from the information processing device 10, the external device 30 according to Modification 1-2 transitions to the state m17 in which an input from the user is awaited.

While the state remains in the state m17, when control information for connection to the communication device 90 input by the user is received from the information processing device 10, the external device 30 transitions to the state m13 indicating that the connection mode is being switched.

When the state transitions to the state m13, the external device 30 disconnects communication with the information processing device 10 and the external device 30 set as the slave unit ST accesses the communication device 90 operated as the master unit AP. Then, the external device 30 transmits the control information acquired from the information processing device 10 to the communication device 90 and performs an authentication process for establishing communication with the communication device 90 based on the control information.

The following processes are the same as those in the example shown in FIG. 4. That is, while the external device 30 remains in the state m13, the information processing device 10 monitors a state of communication between the external device 30 and the communication device 90, and presents progress of the process of switching a connection mode of the external device 30 to the user according to the communication state.

When authentication with the communication device 90 is successful, the external device 30 transitions to the state m15 in which an operation is performed in the multiconnection mode.

On the other hand, when authentication with the communication device 90 has failed, the external device 30 transitions to the state m11 in which an operation is performed in the single connection mode again. In this case, the information processing device 10 presents the result of the process of switching a connection mode of the external device 30 to the user based on a state of communication between the external device 30 and the communication device 90. In addition, when the state transitions to the state m11 in which an operation is performed in the single connection mode again, the external device 30 may establish communication with the information processing device 10 again.

An example of operations of the information processing system according to Modification 1-2 has been described above with reference to FIG. 10.

The above-described example is only an example. Operations of the external device 30 are not particularly limited as long as control information input by the user can be acquired before the external device 30 accesses the communication device 90 in order to establish communication with the communication device 90. For example, the external device 30 may receive an instruction to switch to the multiconnection mode and control information input by the user from the information processing device 10. In this case, the state m17 is not necessarily provided as shown in FIG. 10. For example, the state of the external device 30 may transition as shown in FIG. 4.

[1.7. Summary]

As described above, in the information processing system according to the present embodiment, the information processing device 10 acquires control information indicating a connection state between the external device 30 and the communication device 90 based on a method different from communication via the network n11.

In such a configuration, even when the network n11 is disconnected according to switching of a connection mode of the external device 30, the information processing device 10 can recognize progress and a result of the process of switching a connection mode. Therefore, in the information processing system according to the present embodiment, even when the external device 30 having a limited input and output interface is used, it is possible to present progress and a result of the process of switching a connection mode of the external device 30 to the user through the information processing device 10.

In Modification 1-1, an example in which the WPS-PBC scheme is applied has been described. However, it is needless to say that a WPS-PIN scheme can be applied. In addition, when the WPS-PIN scheme is applied, as shown in Modification 1-2, when the user instructs the external device 30 to switch a connection mode through the information processing device 10, a personal identification number (PIN) for the external device 30 to connect to the communication device 90 can be designated.

Figure 11:
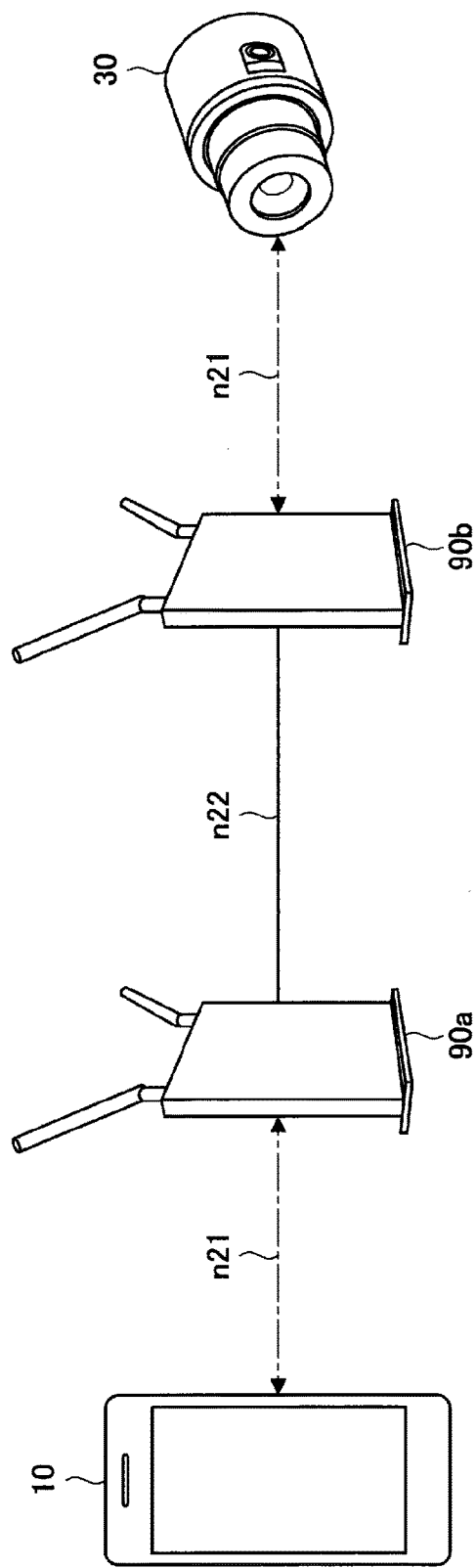
FIG. 11 is an explanatory diagram for describing another form in which an information processing device and an external device are connected through a communication device.

In addition, in the above description, as shown in FIG. 1, the example in which the information processing device 10 and the external device 30 are connected through the one communication device 90 has been described. However, a communication manner thereof is not limited to the example shown in FIG. 1 as long as communication is possible through the communication device 90 such as a router. For example, FIG. 11 is an explanatory diagram for describing another form in which the information processing device 10 and the external device 30 are connected through the communication device 90 such as a router. As shown in FIG. 11, a plurality of the communication devices 90a and 90b may be connected via a network n22 (for example, a local area network (LAN) or a wide area network (WAN)). In this case, the information processing device 10 and the external device 30 may be connected via, for example, the networks n21 and n22.

In addition, operations of the information processing system according to the present embodiment described above based on FIG. 4 to FIG. 10 may be appropriately switched and performed. As a specific example, when a connection mode of the external device 30 is switched, the user can select whether the WPS-PBC scheme is used or whether control information for the external device 30 to connect to the communication device 90 is input.

Figure 12:
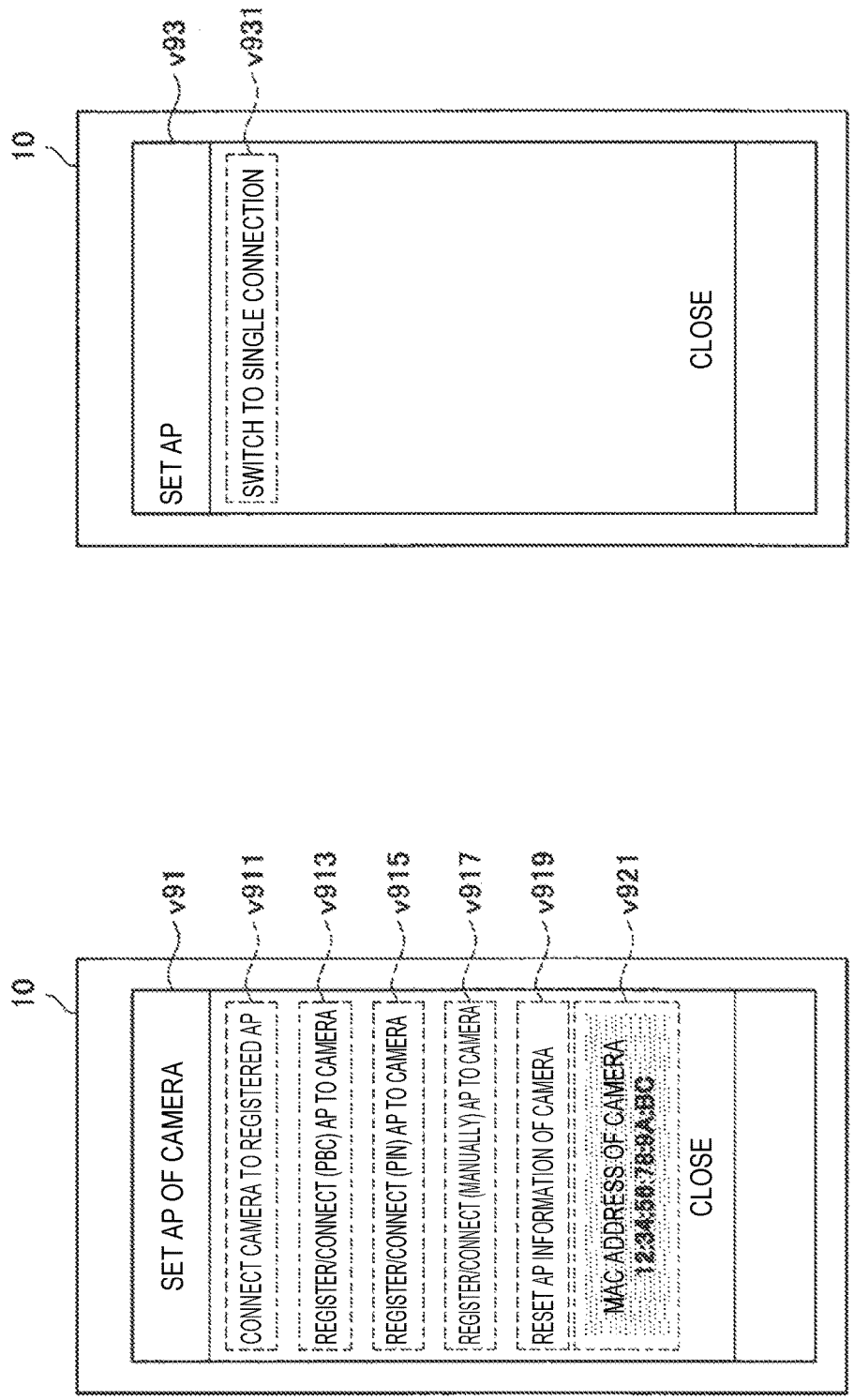
FIG. 12 shows an example of a selection screen that is displayed on an information processing device when a connection mode of an external device is switched.

For example, FIG. 12 shows an example of a selection screen that is displayed on the information processing device 10 in order to select a method of performing the switching (for example, whether the WPS-PBC scheme is used) when a connection mode of the external device 30 is switched. A selection screen v91 shows an example of a selection screen when a connection mode of the external device 30 operated in the single connection mode is switched to the multiconnection mode and displays selection menus v911 to v919 corresponding to operation modes.

The selection menu v911 corresponds to a method in which the external device 30 is connected to the communication device 90 to which the external device 30 has been connected before based on registered control information. In addition, the selection menu v913 corresponds to a method in which the external device 30 is caused to be connected to the communication device 90 based on the WPS-PBC scheme. In addition, the selection menu v915 corresponds to a method in which the external device 30 is caused to be connected to the communication device 90 based on the PIN input by the user. In addition, the selection menu v917 corresponds to a method in which the external device 30 is caused to be connected to the communication device 90 based on control information such as an SSID and a password designated by the user.

In addition, the control information registered in the external device 30 may be deleted (reset) based on an instruction from the information processing device 10. The selection menu v919 is a selection menu for instructing the external device 30 to delete the registered control information.

In addition, as indicated by a reference sign v921, identification information for identifying the external device 30 acquired by the information processing device 10 from the external device 30 may be displayed on a screen of the information processing device 10.

In addition, a selection screen v93 shows an example of a selection screen when a connection mode of the external device 30 operated in the multiconnection mode is switched to the single connection mode. A selection menu v931 for instructing switching to, for example, the single connection mode is displayed on the selection screen v93.

<2. Second Embodiment>

[2.1. Overview]

Figure 13:
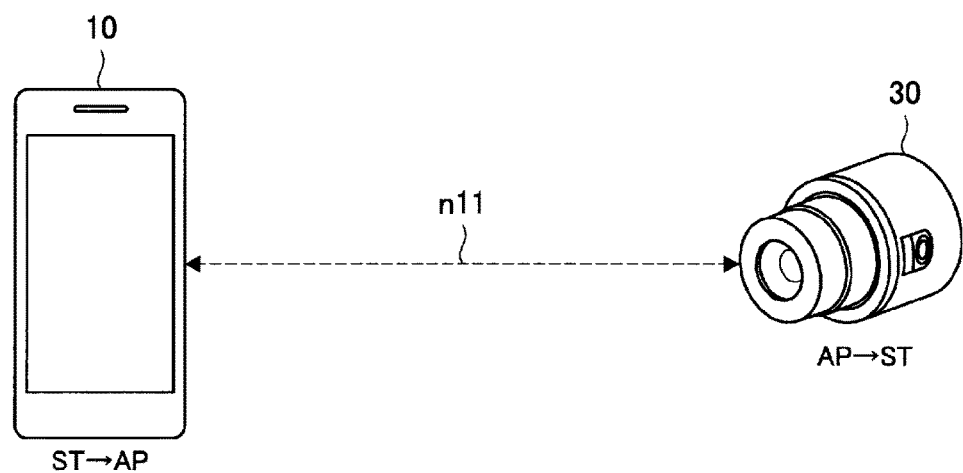
FIG. 13 is an explanatory diagram for describing an overview of the information processing system according to the present embodiment
Figure 14:
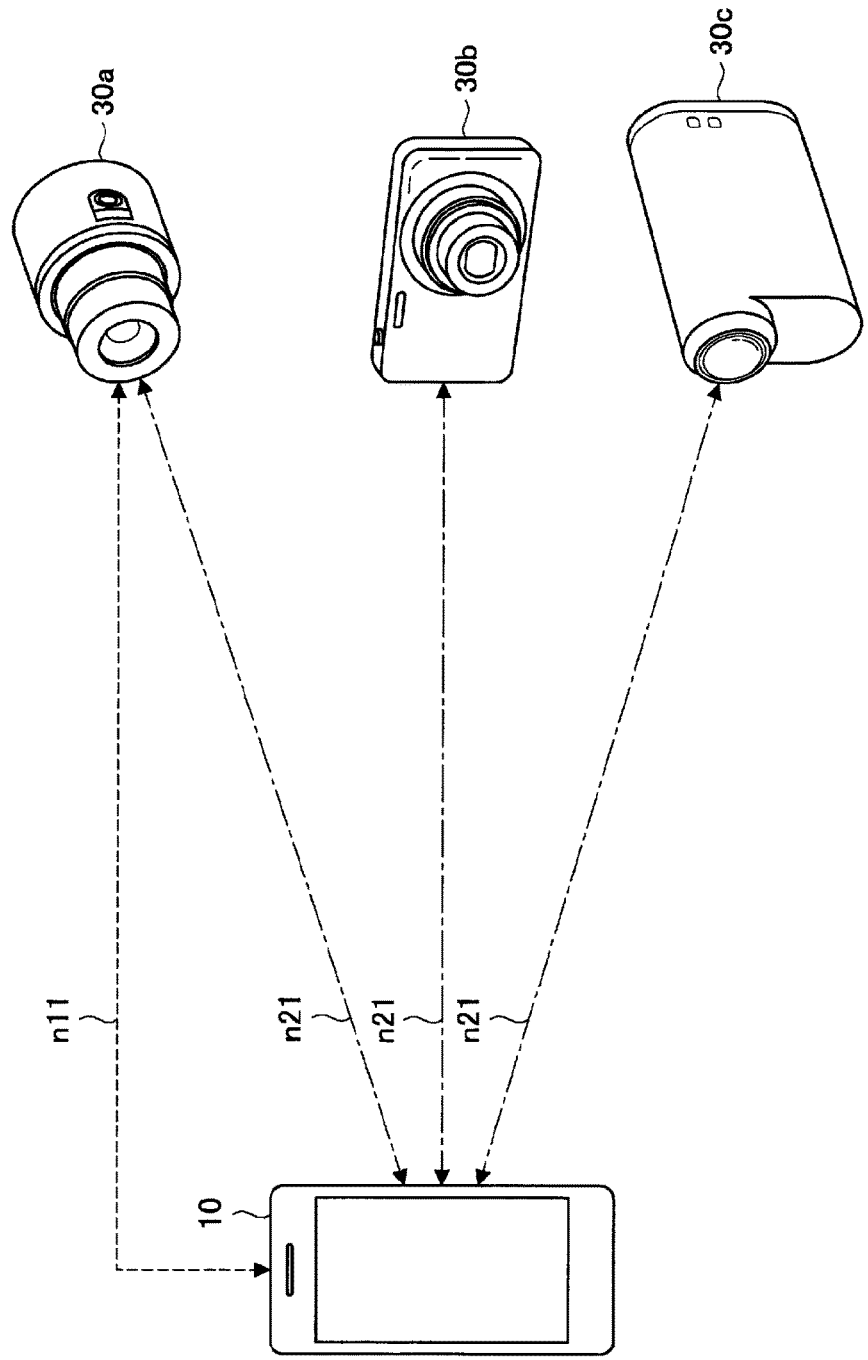
FIG. 14 is an explanatory diagram for describing an overview of the information processing system according to the present embodiment

Next, an information processing system according to the second embodiment will be described. First, an overview of the information processing system according to the present embodiment will be described with reference to FIG. 13 and FIG. 14. FIG. 13 and FIG. 14 are explanatory diagrams for describing an overview of the information processing system according to the present embodiment.

In the present embodiment, as shown in FIG. 13, a case in which a connection mode in which the information processing device 10 set as the slave unit ST is connected to the external device 30 serving as the master unit AP is switched to a connection mode in which the information processing device 10 set as the master unit AP and the external device 30 set as the slave unit ST are connected will be described.

For example, FIG. 14 shows an application example of the information processing system according to the present embodiment. Specifically, when the external device 30 is operated as the master unit AP, the information processing device 10 serving as the slave unit ST is connected to the external device 30 via the network n11. Therefore, the external device 30 and the information processing device 10 are connected in one-to-one correspondence. When the external device 30 is set as the master unit AP, a device different from the information processing device 10 may be connected to the external device 30 via the network n11.

In addition, when the information processing device 10 is operated as the master unit AP, a plurality of the external devices 30 operated as the slave units STs are connected to the information processing device 10. For example, in the example shown in FIG. 14, when the information processing device 10 is operated as the master unit AP, the external devices 30a to 30c operated as the slave units STs are connected via the network n21.

For example, when the information processing device 10 and the external device 30a are connected in one-to-one correspondence via the network n11, the information processing device 10 can instruct the external device 30a to capture an image via the network n11. In addition, when the information processing device 10 and the external devices 30a to 30c are connected via the network n21, the information processing device 10 can instruct the external devices 30a to 30c to capture an image at the same time (or individually) via the network n21. That is, in the information processing system according to the present embodiment, the information processing device 10 and the external devices 30 may be configured such that a communication form between the information processing device 10 and the external device 30 is switched and thus a manipulation mode of each of the external device 30 is switched via a network.

In this manner, in the present embodiment, an example in which the information processing device 10 and the external device 30 switch each connection mode, and thus a connection mode between the information processing device 10 and the external device 30 is switched will be described.

[2.2. Functional Configuration]

Figure 15:
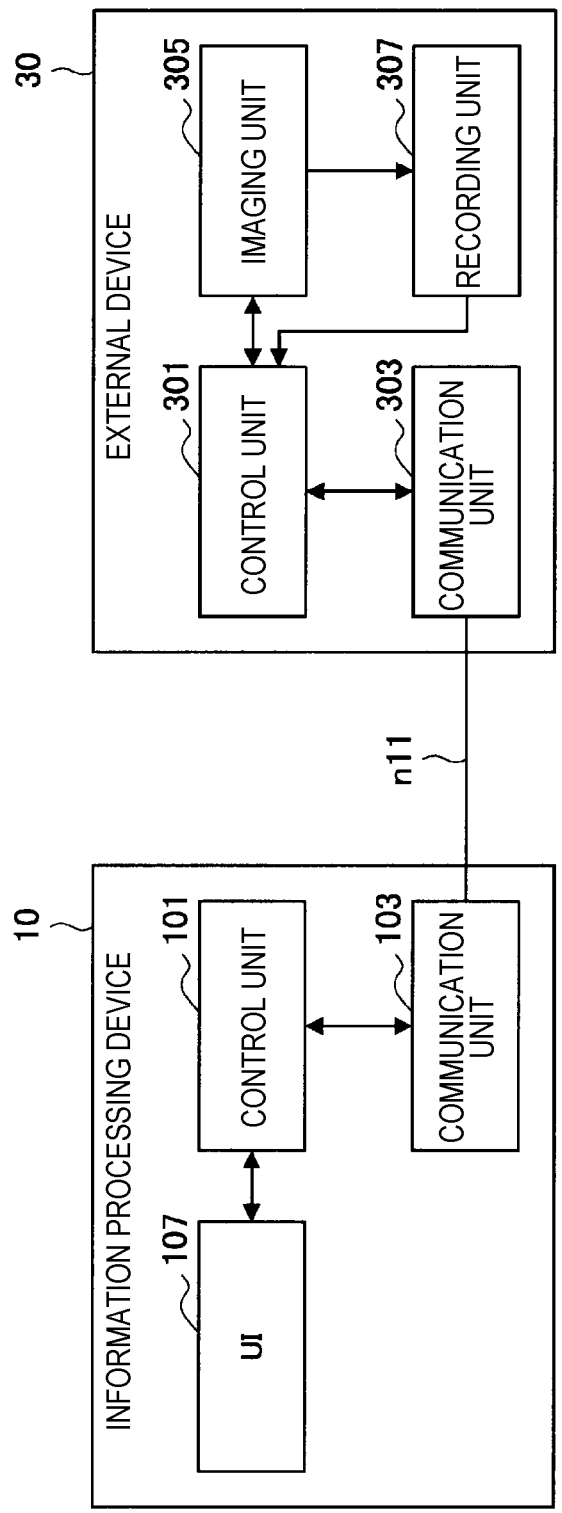
FIG. 15 is an explanatory diagram for describing an example of a functional configuration of an information processing system according to a second embodiment of the present disclosure.

First, an example of a functional configuration of the information processing system according to the present embodiment will be described with reference to FIG. 15, particularly focusing on a function of switching a communication form in the information processing device 10 and the external device 30. FIG. 15 is an explanatory diagram for describing an example of a functional configuration of the information processing system according to the present embodiment. This description will proceed focusing on a case in which the information processing device 10 operated as the master unit AP instructs the external device 30 operated in the single connection mode to switch to the multiconnection mode, and the external device 30 set as the slave unit ST is connected to it (that is, the information processing device 10).

As shown in FIG. 15, the information processing device 10 includes the control unit 101, the communication unit 103 and the UI 107. In addition, the external device 30 includes the control unit 301 and the communication unit 303. In addition, the external device 30 may include the imaging unit 305 and the recording unit 307. The configurations included in the information processing device 10 described above may be implemented by a hardware circuit of the information processing device 10. Similarly, the configurations included in the external device 30 described above may be implemented by a hardware circuit of the external device 30. In addition, since operations of the communication unit 103, the UI 107, the communication unit 303, the imaging unit 305, and the recording unit 307 and processes of the control unit 301 controlling the imaging unit 305 and the recording unit 307 are the same as those in the information processing system according to the above-described first embodiment (refer to FIG. 3), detailed descriptions thereof will be omitted.

The control unit 301 according to the present embodiment can control operations for the external device 30 to communicate with the information processing device 10. The control unit 301 can receive an instruction output through a predetermined API from the information processing device 10 connected via the network n11. Based on the instruction from the information processing device 10 output through the API, the control unit 301 performs a process of switching a connection mode and switching a connection destination according to switching of the connection mode.

The control unit 101 according to the present embodiment can control operations of the external device 30 connected via the network n11. As a specific example, the control unit 101 executes an application created based on an API for manipulating the external device 30 via a network and thus controls operations of the external device 30.

In addition, based on an instruction from the user through the UI 107, the control unit 101 instructs the external device 30 to switch a connection mode via the network n11. Operations of the control unit 101 related to switching a connection mode of the external device 30 will be described below.

When an instruction to switch a connection mode of the external device 30 is received from the user through the UI 107, the control unit 101 according to the present embodiment instructs the external device 30 to switch a connection mode via the network n11. In this case, the control unit 101 acquires control information for the external device 30 to establish communication with the communication device 90 such as an SSID, a password, and a PIN from the user through the UI 107 and may notify the external device 30 of the control information.

In addition, the control unit 101 switches the connection mode of the information processing device 10 from the mode in which an operation of the slave unit ST is performed to the mode in which an operation of the master unit AP is performed.

When an instruction to switch a connection mode is received, the external device 30 disconnects the network n11 once, switches the connection mode, and starts a process in which the external device 30 set as the slave unit ST is connected to the information processing device 10 operated as the master unit AP.

When the network n11 is disconnected, the control unit 101 set as the master unit AP receives a connection request from the external device 30 operated as the slave unit ST. Then, the control unit 101 performs procedures (communication sequences) for establishing communication with the external device 30. In this case, the control unit 101 presents progress and a result of the procedure to the user through the UI 107 when each procedure is performed.

It is needless to say that, even when the external device 30 operated in the multiconnection mode is instructed to switch to the single connection mode, the information processing device 10 can directly instruct the external device 30. It is needless to say that, even in this case, when a connection mode is switched, since the information processing device 10 and the external device 30 are directly connected, the control unit 101 can directly recognize progress and a result of each procedure for establishing communication with the external device 30.

The example of the functional configuration of the information processing system according to the present embodiment has been described above with reference to FIG. 15.

[2.3. Processes]

Figure 16:
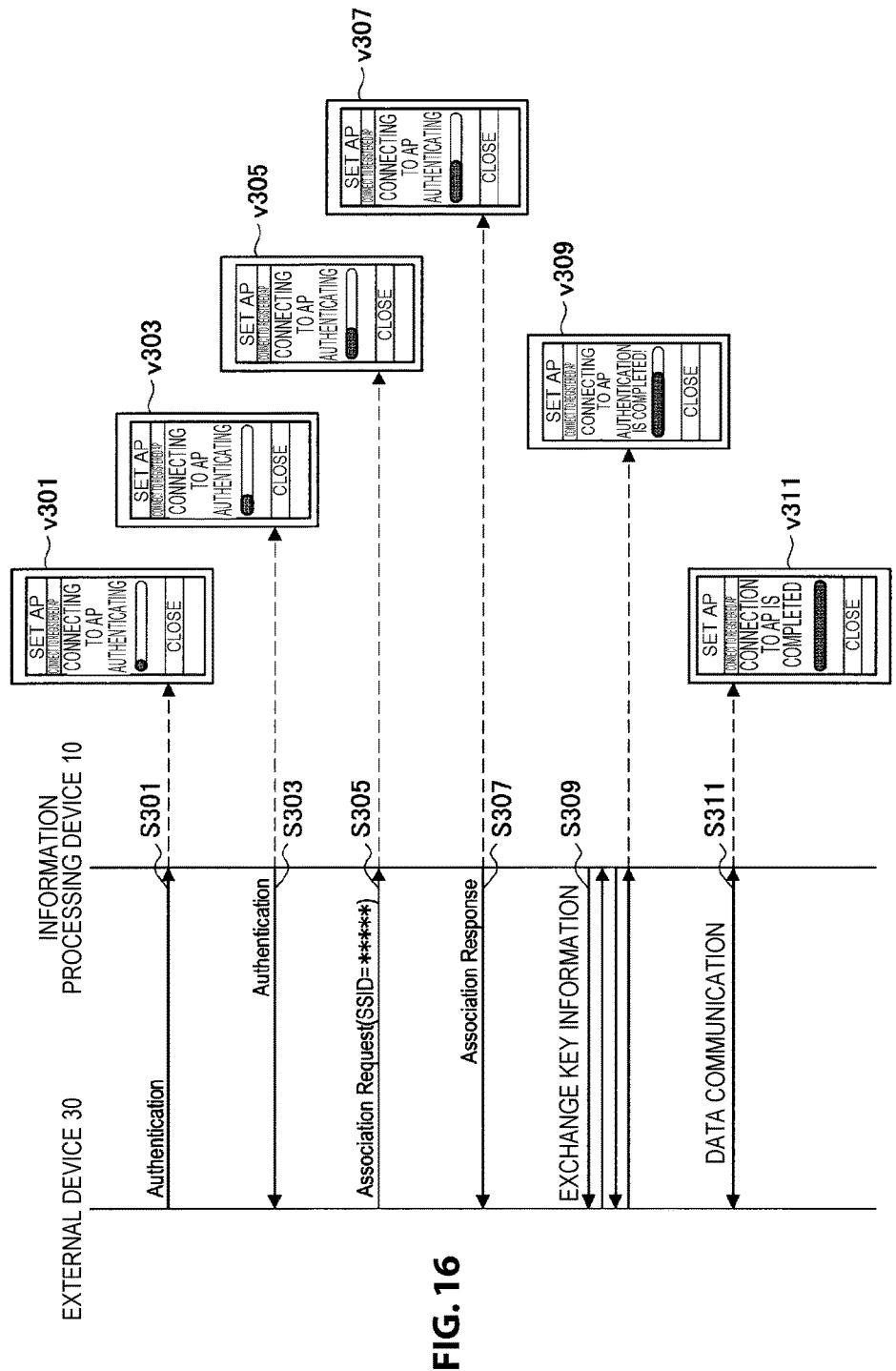
FIG. 16 is an explanatory diagram for describing a flow of a series of processes in the information processing system according to the same embodiment and examples of information presented to the information processing device according to progress of the process.

Next, operations of the information processing system according to the present embodiment when a connection mode of the external device 30 is switched from the single connection mode to the multiconnection mode will be described with reference to FIG. 16. FIG. 16 is an explanatory diagram for describing a flow of a series of processes in the information processing system according to the present embodiment and examples of information presented to the information processing device 10 according to progress of the process. In this description, an example in which the external device 30 is switched from the single connection mode to the multiconnection mode based on the instruction from the information processing device 10 and thus the external device 30 set as the slave unit ST is connected to the information processing device 10 operated as the master unit AP will be described. In addition, in this description, a case in which the external device 30 is connected to the communication device 90 to which the external device 30 has been connected before based on previously registered control information (for example, an SSID and a password) will be described.

In FIG. 16, reference signs 5301 to 5311 correspond to the procedures S101 to S111 between the external device 30 and the communication device 90 described with reference to FIG. 5B in the first embodiment except that a connection destination of the external device 30 is the information processing device 10. Therefore, details of the procedures 5301 to 5311 will not be described. That is, when communication is established between the external device 30 and the information processing device 10, the communication is established mainly through the procedures 5301 to 5309, and data communication indicated by the reference sign 5311 starts.

In addition, the information processing device 10 associates information items v301 to v309 presented to the user with the procedures 5301 to 5309 in advance. Then, whenever any of the procedures 5301 to 5309 is performed, the information processing device 10 presents information corresponding to the performed procedure to the user. For example, in the example shown in FIG. 16, the information processing device 10 causes the information items v301 to v309 to be displayed on an output device such as a display serving as a display screen, and presents the information items v301 to v309 to the user.

Then, when connection with the external device 30 according to switching of a connection mode is completely established, the information processing device 10 presents an information item v311 indicating that the switching of a connection mode of the external device 30 has been successfully completed to the user.

[2.4. Summary]

As described above, when the information processing device 10 and the external device 30 switch a connection mode and thus a connection mode for connection to each other is switched, the information processing device 10 can notify the user of progress and a result of the process of switching a connection mode. Therefore, in the information processing system according to the present embodiment, even when the external device 30 having a limited input and output interface is used, it is possible to present progress and a result of the process of switching a connection mode of the external device 30 to the user through the information processing device 10.

<3. Third Embodiment>

[3.1. Overview]

Figure 17:
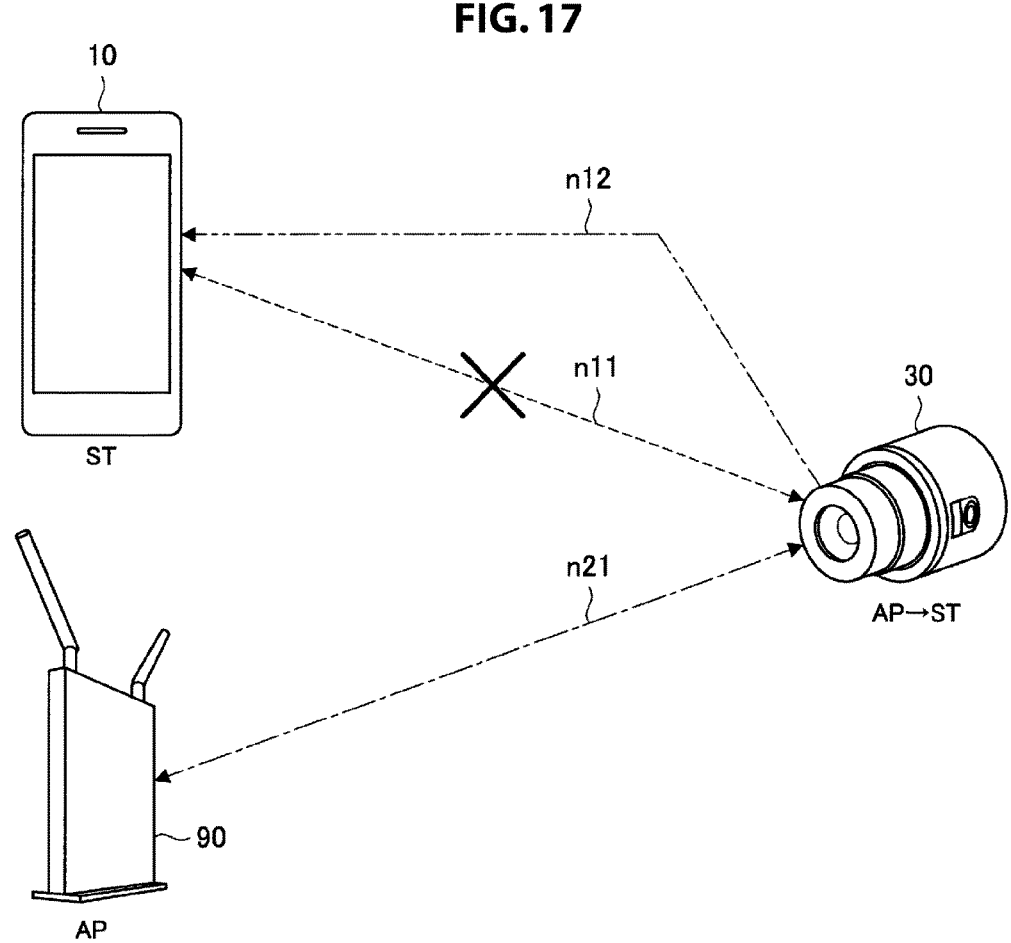
FIG. 17 is an explanatory diagram for describing an overview of an information processing system according to an embodiment according to a third embodiment of the present disclosure.

Next, an information processing system according to the third embodiment will be described. First, an overview of the information processing system according to the present embodiment will be described with reference to FIG. 17. FIG. 17 is an explanatory diagram for describing an overview of the information processing system according to the present embodiment.

In the information processing system according to the first embodiment (refer to FIG. 2), the information processing device 10 acquires (intercepts) data that is transmitted between the external device 30 and the communication device 90 via a wireless network, analyzes the data, and thus recognizes a connection state between the external device 30 and the communication device 90.

On the other hand, in the information processing system according to the present embodiment, as shown in FIG. 17, a network n12 different from the network n11 is established between the information processing device 10 and the external device 30. The network n12 is preferably a network through which a connection state between the information processing device 10 and the external device 30 can be controlled independently from a connection state of the network n11. As a specific example, when the networks n11 and n21 are built as a network based on the Wi-Fi (registered trademark) standard, the network n12 may be built as a network based on, for example, the Bluetooth (registered trademark) standard.

Then, when a connection mode of the external device 30 is switched, the information processing device 10 acquires information indicating a connection state between the external device 30 and the communication device 90 from the external device 30 via the network n12.

In such a configuration, even when the network n11 is disconnected, the information processing device 10 can acquire control information indicating a connection state between the external device 30 and the communication device 90 via the network n12. Therefore, in the information processing system according to the present embodiment, even when the external device 30 having a limited input and output interface is used, it is possible to present progress and a result of the process of switching a connection mode of the external device 30 to the user through the information processing device 10.

The overview of the information processing system according to the present embodiment has been described above with reference to FIG. 17. The information processing system according to the present embodiment will be described below in further detail.

[3.2. Functional Configuration]

Figure 18:
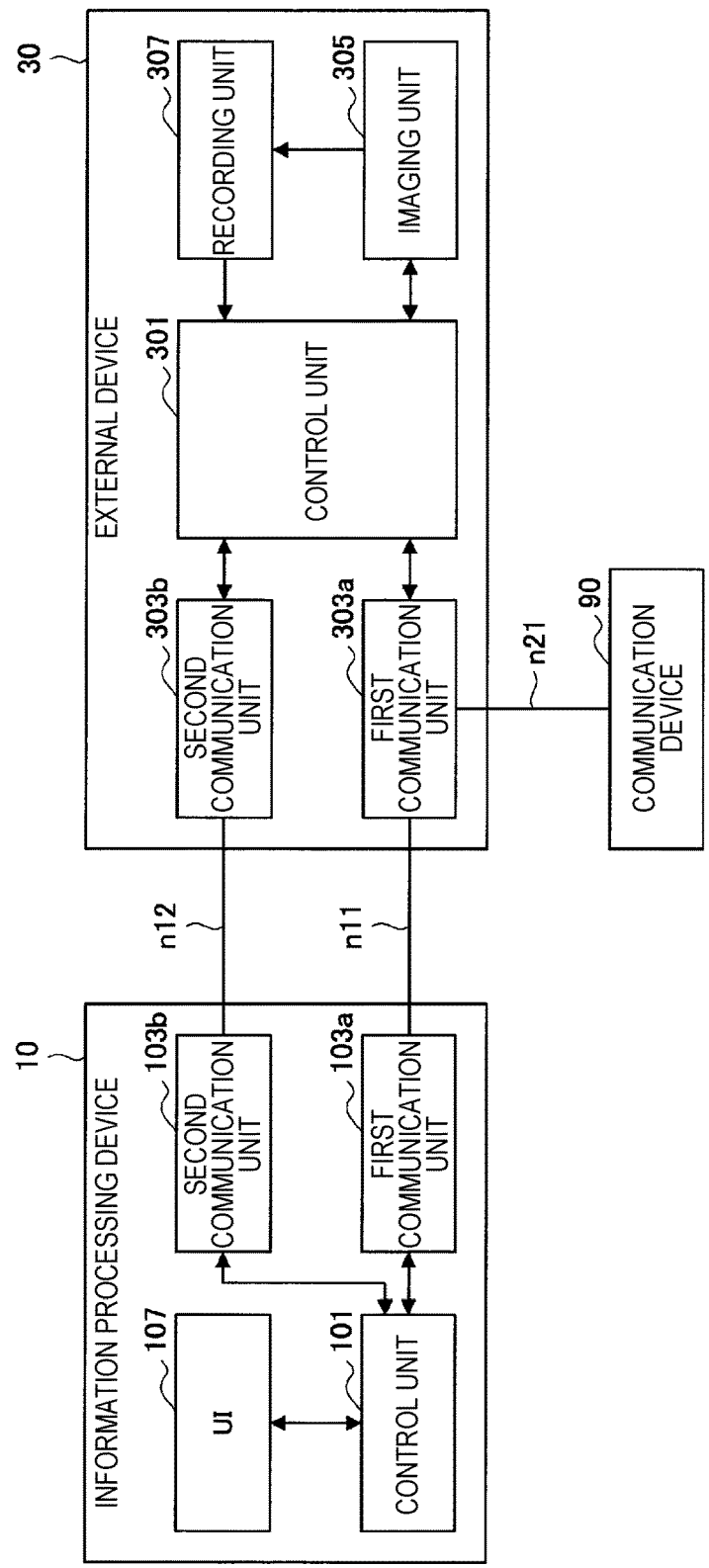
FIG. 18 is an explanatory diagram for describing an example of a functional configuration of the information processing system according to the same embodiment.

An example of a functional configuration of an information processing system according to the present embodiment will be described with reference to FIG. 18. FIG. 18 is an explanatory diagram for describing an example of a functional configuration of the information processing system according to the present embodiment. This description will proceed focusing on a case in which the information processing device 10 instructs the external device 30 operated in the single connection mode to switch to the multiconnection mode and thus the external device 30 set as the slave unit ST is connected to the communication device 90 operated as the master unit AP As shown in FIG. 18, the information processing device 10 includes the control unit 101, the first communication unit 103a, the second communication unit 103b, and the UI 107. In addition, the external device 30 includes the control unit 301, the first communication unit 303a, and the second communication unit 303b. The first communication unit 103a corresponds to the communication unit 103 (refer to FIG. 3) according to the first embodiment. Similarly, the first communication unit 303a corresponds to the communication unit 303 according to the first embodiment. The configurations included in the information processing device 10 described above may be implemented by a hardware circuit of the information processing device 10. Similarly, the configurations included in the external device 30 described above may be implemented by a hardware circuit of the external device 30. In addition, since operations of the imaging unit 305 and the recording unit 307 and processes of the control unit 301 controlling the imaging unit 305 and the recording unit 307 are the same as those in the information processing system according to the above-described first embodiment (refer to FIG. 3), detailed descriptions thereof will be omitted.

The second communication unit 303b is a communication interface for configurations within the external device 30 to communicate with the information processing device 10 via the network n12 that is different from the networks n11 and n21. The second communication unit 303b can be independently operated without depending on an operation state of the first communication unit 303a (in other words, a connection state of the networks n11 and n21).

Similarly, the second communication unit 103b is a communication interface for the configurations within the information processing device 10 to communicate with the external device 30 via the network n12. In addition, the second communication unit 103b can be independently operated without depending on an operation state of the first communication unit 103a (in other words, a connection state of the network n11).

The control unit 301 according to the present embodiment controls operations for the external device 30 to perform communication with another device such as the information processing device 10 or the communication device 90. The control unit 301 can receive an instruction output through a predetermined API from the information processing device 10 connected via the network n11. Based on the instruction from the information processing device 10 output through the API, the control unit 301 performs a process of switching a connection mode and switching a connection destination according to switching of the connection mode.

In addition, when the process of switching a connection mode is performed, the control unit 301 notifies the information processing device 10 of control information indicating a connection state between the external device 30 and a connection destination (for example, the communication device 90) of the external device 30 via the network n12. Within the control unit 301, a configuration of notifying the information processing device 10 of the control information via the network n12 corresponds to an example of a "notification unit."

The UI 107 is a user interface for the user to manipulate the information processing device 10, similarly to the UI 107 according to the above-described first embodiment. The UI 107 may include an output device for the information processing device 10 to present information to the user, for example, a display. In addition, the UI 107 may include an input device for the user to manipulate the information processing device 10, for example, a button or a touch panel.

The control unit 101 according to the present embodiment can control operations of the external device 30 connected via the network n11. As a specific example, the control unit 101 executes an application created based on an API for manipulating the external device 30 via a network and thus controls operations of the external device 30.

In addition, based on an instruction from the user through the UI 107, the control unit 101 instructs the external device 30 to switch a connection mode via the network n11. Operations of the control unit 101 related to switching a connection mode of the external device 30 will be described below.

When an instruction to switch a connection mode of the external device 30 is received from the user through the UI 107, the control unit 101 according to the present embodiment instructs the external device 30 to switch a connection mode via the network n11. In this case, the control unit 101 acquires control information for the external device 30 to establish communication with the communication device 90 such as an SSID, a password, and a PIN from the user through the UI 107 and may notify the external device 30 of the control information.

When an instruction to switch a connection mode is received, the external device 30 disconnects the network n11, switches the connection mode, and starts a process in which the external device 30 set as the slave unit ST is connected to the communication device 90 operated as the master unit AP. In addition, the external device 30 may sequentially notify the information processing device 10 (that is, the control unit 101) of control information indicating a state of communication with the communication device 90 according to switching of the connection mode via the network n12.

When the network n11 is disconnected, the control unit 101 sequentially acquires control information indicating a state of communication between the external device 30 and the communication device 90 from the external device 30 via the network n12. The control unit 101 specifies which procedure is performed among procedures defined in the standard of a network that connects the external device 30 and the communication device 90 based on the control information acquired from the external device 30. Then, the control unit 101 recognizes progress of the process of switching a connection mode of the external device 30, that is, which procedures have been completed so far, according to the specified procedure. Within the control unit 101, a configuration of acquiring the control information from the external device 30 via the network n12 corresponds to an example of an "acquisition unit" in the present embodiment.

As described above, the control unit 101 acquires control information indicating a connection state between the external device 30 and the communication device 90, and recognizes progress and a result of the process of switching a connection mode of the external device 30 based on the control information. Then, the control unit 101 presents the recognized progress and result of the process to the user through the UI 107.

When the external device 30 operated in the multiconnection mode is instructed to switch to the single connection mode, the control unit 101 is connected to the communication device 90 via the network n21 and may instruct the external device 30 to switch a connection mode through the communication device 90. In addition, when the mode is switched to the single connection mode, after the network n21 is disconnected, the information processing device 10 and the external device 30 are connected via the network n11. Therefore, the control unit 101 may acquire progress and a result of the process of switching a connection mode from the external device 30 via the network n11, and may recognize progress and a result of the process based on control information acquired via the network n12 as described above.

The example of the functional configuration of the information processing system according to the present embodiment has been described above with reference to FIG. 18.

[3.3. Processes]

Figure 19:
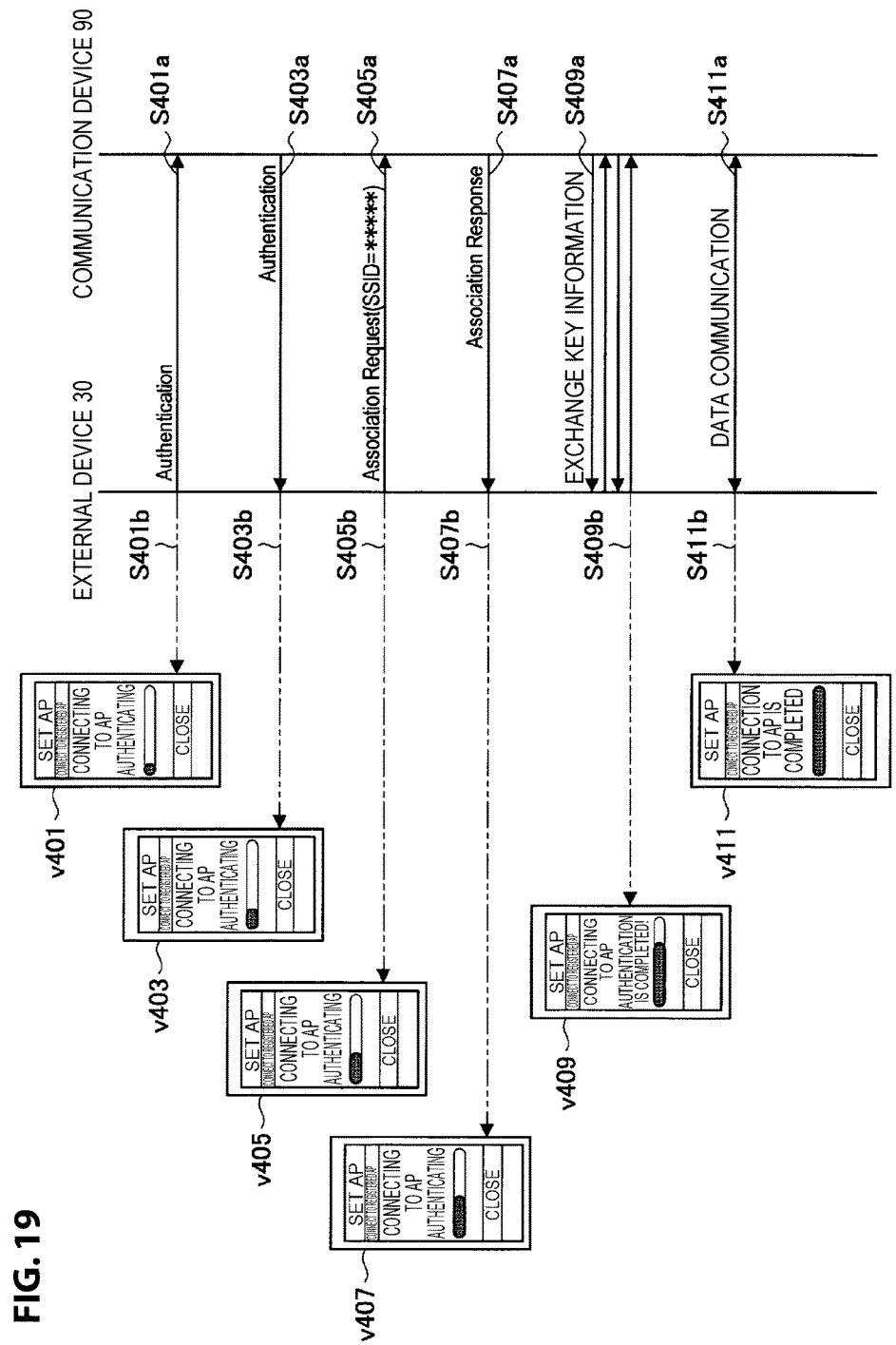
FIG. 19 is an explanatory diagram for describing a flow of a series of processes in the information processing system according to the same embodiment and examples of information presented to the information processing device according to progress of the process.
Figure 20:
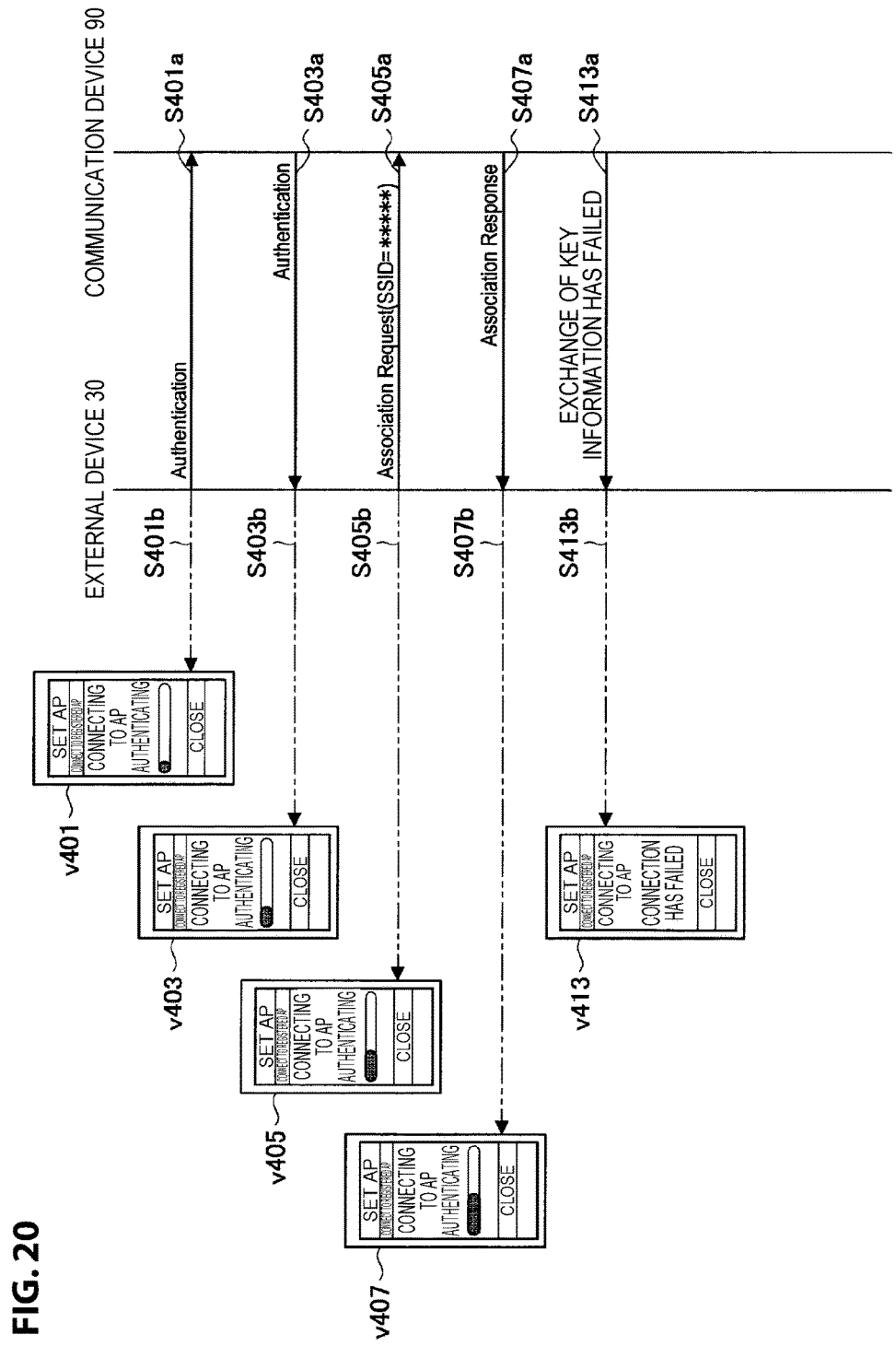
FIG. 20 is an explanatory diagram for describing a flow of a series of processes in the information processing system according to the same embodiment and examples of information presented to the information processing device according to progress of the process.

Next, operations of the information processing system according to the present embodiment when a connection mode of the external device 30 is switched from the single connection mode to the multiconnection mode will be described with reference to FIG. 19 and FIG. 20. FIG. 19 and FIG. 20 are explanatory diagrams for describing a flow of a series of processes in the information processing system according to the present embodiment and examples of information presented to the information processing device 10 according to progress of the process. In this description, an example in which the external device 30 is switched from the single connection mode to the multiconnection mode based on the instruction from the information processing device 10 and the external device 30 set as the slave unit ST is connected to the communication device 90 operated as the master unit AP will be described. In addition, in this description, a case in which the external device 30 is connected to the communication device 90 to which the external device 30 has been connected before based on previously registered control information (for example, an SSID and a password) will be described.

First, an example of a flow of a series of processes of an information processing system when authentication between the external device 30 and the communication device 90 is successful and connection is established between the external device 30 and the communication device 90 will be described with reference to FIG. 19.

In FIG. 19, reference signs S401a to S411a correspond to the procedures S101 to S111 between the external device 30 and the communication device 90 described with reference to FIG. 5B in the first embodiment, respectively. Therefore, details of the procedures S401a to S411a will not be described. That is, when communication is established between the external device 30 and the communication device 90, the communication is established mainly through the procedures S401a to S409a, and data communication indicated by the reference sign S411a starts.

On the other hand, whenever any of the procedures S401a to S409a is performed, the external device 30 transmits a state of the procedure, that is, control information indicating a connection state with the communication device 90, to the information processing device 10 via the network n12, as indicated by reference signs S401b to S409b.

As indicated by the reference signs S401b to S409b, the information processing device 10 associates information items v401 to v409 presented to the user with connection states (in other words, the procedures S401a to S409a) indicated by each piece of control information transmitted from the external device 30 via the network n12 in advance. For example, in the example shown in FIG. 19, the information processing device 10 causes the information items v401 to v409 to be displayed on an output device such as a display serving as a display screen and presents the information items v401 to v409 to the user.

In addition, when the procedures S401a to S409a are completed and communication with the communication device 90 is established via the network n21, as indicated by a reference sign S411b, the external device 30 transmits control information indicating that the switching of a connection mode is completed to the information processing device 10 via the network n12. As indicated by the reference sign S411b, when control information indicating that the switching of a connection mode is completed is received via the network n12, the information processing device 10 presents an information item v411 indicating that the switching of a connection mode of the external device 30 has been successfully completed to the user.

When authentication between the external device 30 and the communication device 90 has failed, the external device 30 may transmit control information indicating that the authentication has failed to the information processing device 10 via the network n12.

For example, FIG. 20 shows an example of a flow of a series of processes of an information processing system when authentication between the external device 30 and the communication device 90 has failed and connection is not established between the external device 30 and the communication device 90. The example shown in FIG. 20 shows an example in which, among the procedures S401a to S409a in FIG. 19, the procedure S409a of exchanging key information has failed.

Specifically, when exchange of key information has failed as indicated by a reference sign S413a, the external device 30 transmits control information indicating that the exchange of key information has failed to the information processing device 10 via the network n12 as indicated by a reference sign S413b. In this case, the information processing device 10 recognizes that the external device 30 has failed to exchange key information with the communication device 90 based on the received control information, and may present an information item v413 indicating that the switching of a connection mode of the external device 30 is abnormally terminated to the user.

In such a configuration, when a connection mode of the external device 30 is switched from the single connection mode to the multiconnection mode, the information processing system according to the present embodiment can present progress and a result of the process of switching to the user through the information processing device 10.

[3.4. Modification 2: When a WPS-PBC is Used]

Figure 21:
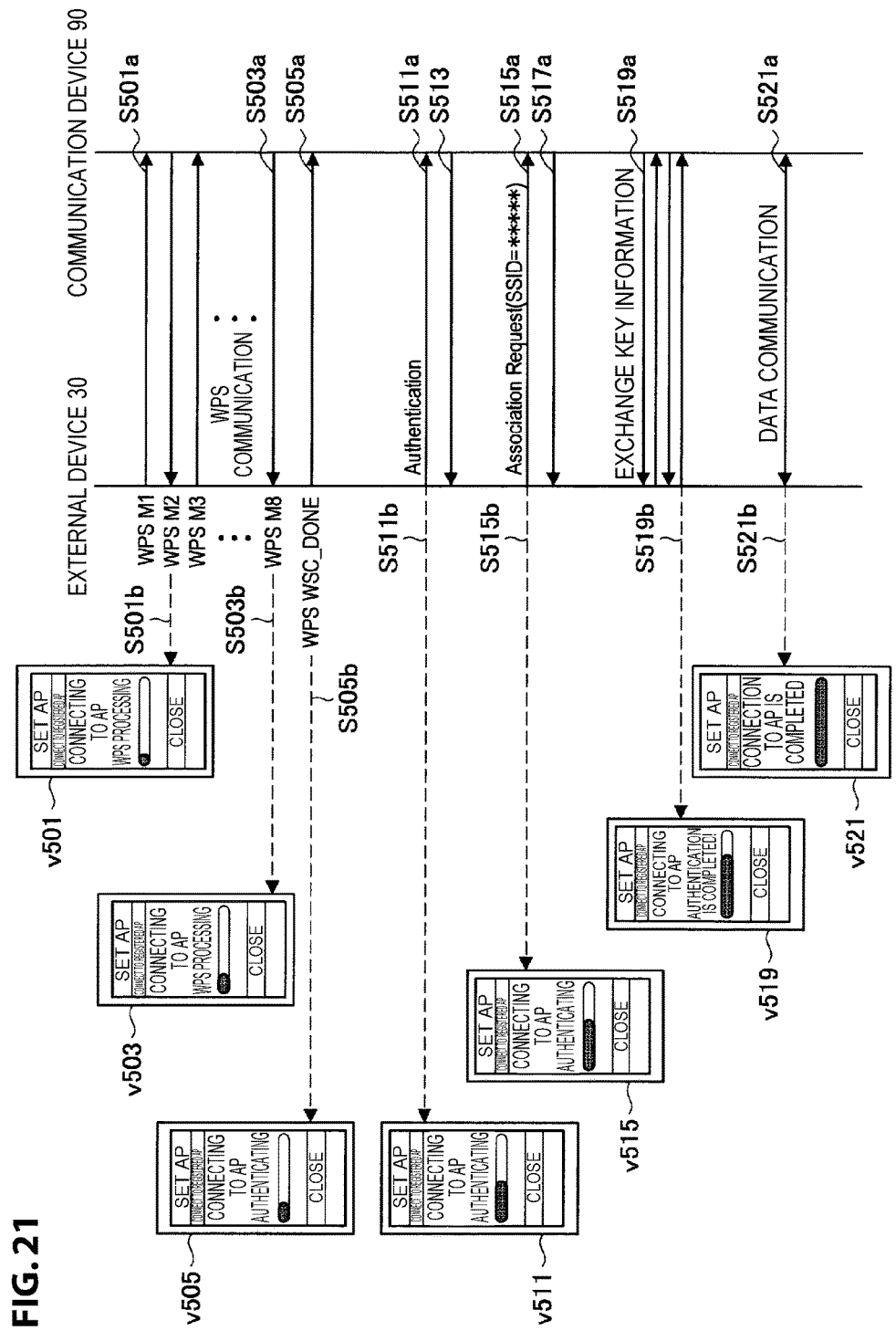
FIG. 21 is an explanatory diagram for describing a flow of a series of processes in an information processing system according to Modification 2 and examples of information presented to the information processing device according to progress of the process.

Next, as Modification 2, operations of the information processing system according to the present embodiment when the external device 30 set as the slave unit ST is connected to the communication device 90 operated as the master unit AP using the WPS-PBC scheme will be described with reference to FIG. 21. FIG. 21 is an explanatory diagram for describing a flow of a series of processes in the information processing system according to Modification 2 and examples of information presented to the information processing device 10 according to progress of the process. FIG. 21 shows an example of communication sequences when connection between the external device 30 and the communication device 90 is established based on the WPS-PBC scheme.

In FIG. 21, reference signs S501a to S521a correspond to the procedures S201 to S221 between the external device 30 and the communication device 90 described with reference to FIG. 9 in Modification 1-1 of the first embodiment, respectively. Therefore, details of the procedures S501a to S521a will not be described. That is, when communication is established between the external device 30 and the communication device 90, the communication is established mainly through procedures indicated by the reference signs S501a to S519a, and data communication indicated by the reference sign S521a starts.

On the other hand, similarly to the above-described embodiments, whenever any of the procedures S501a to S519a is performed, as indicated by the reference signs S501b to S519b, the external device 30 transmits a state of the procedure, that is, control information indicating a connection state with the communication device 90, to the information processing device 10 via the network n12.

As indicated by the reference signs S501b to S519b, the information processing device 10 associates information items v501 to v519 presented to the user with connection states (in other words, the procedures S501a to S519a) indicated by each piece of control information transmitted from the external device 30 via the network n12 in advance. For example, in the example shown in FIG. 21, the information processing device 10 causes the information items v501 to v519 to be displayed on an output device such as a display serving as a display screen and presents the information items v501 to v519 to the user.

In addition, when the procedures S501a to S519a are completed and communication with the communication device 90 is established via the network n21, as indicated by a reference sign S521b, the external device 30 transmits control information indicating that the switching of a connection mode is completed to the information processing device 10 via the network n12. As indicated by the reference sign S521b, when the control information indicating that the switching of a connection mode is completed is received via the network n12, the information processing device 10 presents an information item v521 indicating that the switching of a connection mode of the external device 30 has been successfully completed to the user.

When authentication between the external device 30 and the communication device 90 has failed, the external device 30 may transmit control information indicating that the authentication has failed to the information processing device 10 via the network n12. When the control information is received, the information processing device 10 may present information indicating that the switching of a connection mode of the external device 30 is abnormally terminated to the user.

In such a configuration, even when a connection mode of the external device 30 is switched based on the WPS-PBC scheme, the information processing system according to the present embodiment can present progress and a result of the process of switching to the user through the information processing device 10.

[3.5. Summary]

As described above, in the information processing system according to the present embodiment, when a connection mode of the external device 30 is switched, the information processing device 10 acquires information indicating a connection state between the external device 30 and the communication device 90 from the external device 30 via the network n12. In other words, the information processing device 10 acquires control information indicating a connection state between the external device 30 and the communication device 90 based on communication via the network n12 that is different from the network n11.

In such a configuration, even when the network n11 is disconnected according to switching of a connection mode of the external device 30, the information processing device 10 can recognize progress and a result of the process of switching a connection mode. Therefore, in the information processing system according to the present embodiment, even when the external device 30 having a limited input and output interface is used, it is possible to present progress and a result of the process of switching a connection mode of the external device 30 to the user through the information processing device 10.

<4. Hardware Configuration>

Figure 22:
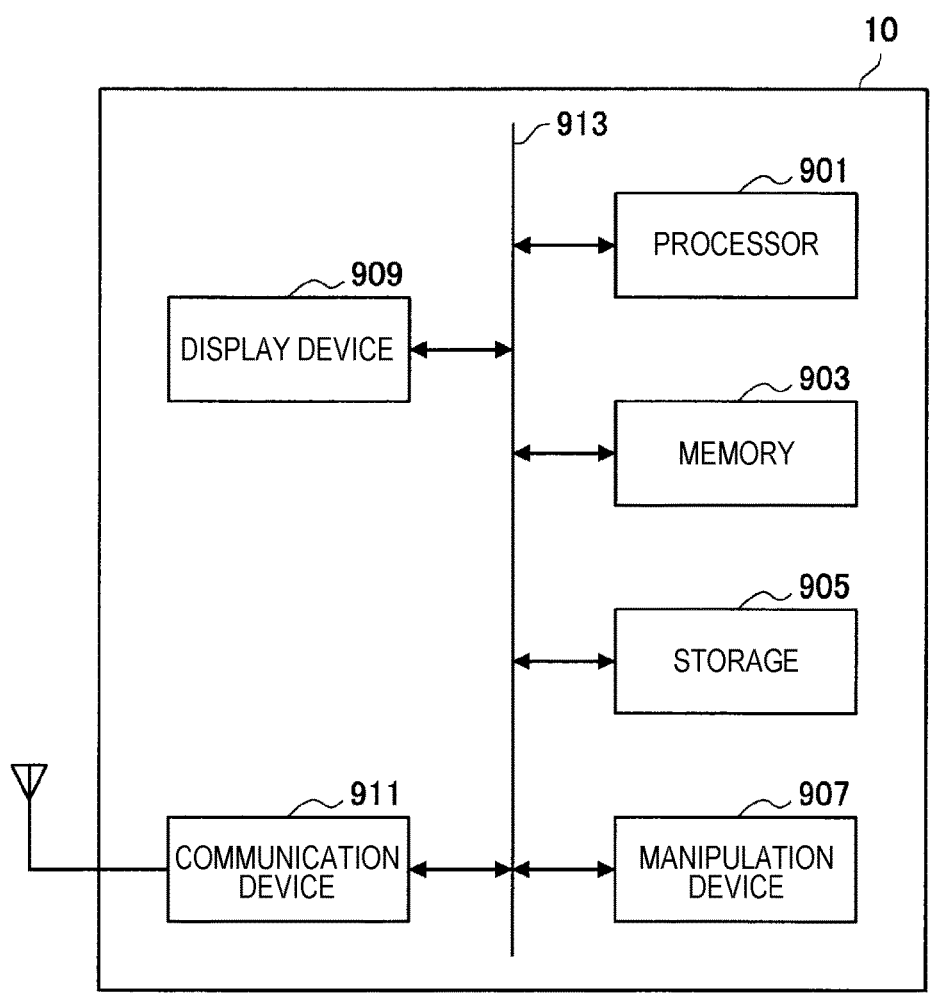
FIG. 22 is a diagram showing an example of a hardware configuration of the information processing device according to the present embodiment.

Next, an example of a hardware configuration of the information processing device 10 according to an embodiment of the present disclosure will be described with reference to FIG. 22. FIG. 22 is a diagram showing an example of a hardware configuration of the information processing device 10 according to the present embodiment.

As shown in FIG. 22, the information processing device 10 according to the present embodiment includes a processor 901, a memory 903, a storage 905, a manipulation device 907, a display device 909, a communication device 911, and a bus 913.

The processor 901 may be, for example, a central processing unit (CPU), a graphics processing unit (GPU), a digital signal processor (DSP) or a system on chip (SoC), and performs various processes of the information processing device 10. The processor 901 can include, for example, an electronic circuit for performing various computing processes. The above-described functions of the control unit 101 may be implemented by the processor 901.

The memory 903 includes a random access memory (RAM) and a read only memory (ROM) and stores programs and data that are executed by the processor 901. The storage 905 may include a storage medium such as a semiconductor memory or a hard disk.

The manipulation device 907 includes a function of generating an input signal for the user to perform a desired manipulation. The manipulation device 907 may include an input unit for the user to input information, for example, a button or a switch, and an input control circuit configured to generate an input signal based on an input by the user and supply the signal to the processor 901.

The display device 909 is an example of an output device, and may be a display device such as a liquid crystal display (LCD) device, and an organic light emitting diode (OLED) display device. The display device 909 can provide information by displaying a screen for the user.

The communication device 911 is a communication unit of the information processing device 10 and performs communication with an external device via a network. The communication device 911 is a wireless communication interface, and may include a communication antenna, a radio frequency (RF) circuit, and a baseband processor.

The communication device 911 includes a function of performing various types of signal processing of a signal received from the external device, and can supply a digital signal generated from a received analog signal to the processor 901. The above-described communication unit 103, first communication unit 103a, and second communication unit 103b may be implemented by the communication device 911. In addition, the above-described monitoring unit 105 may include the communication device 911.

The bus 913 connects the processor 901, the memory 903, the storage 905, the manipulation device 907, the display device 909, and the communication device 911 to one another. The bus 913 may include a plurality of types of buses.

In addition, a program for hardware such as a processor, a memory, and a storage built in a computer to execute the same functions as the configurations of the above-described information processing device 10 can be created. In addition, a computer readable storage medium in which the program is recorded may be provided.

<5. Summary>

As described above, in the information processing systems according to the embodiments of the present disclosure, when a connection mode of the external device 30 is switched, the information processing device 10 acquires information indicating a connection state between the external device 30 and the communication device 90 based on a method different from communication via the network n11.

In such a configuration, even when the network n11 is disconnected according to switching of a connection mode of the external device 30, the information processing device 10 can recognize progress and a result of the process of switching a connection mode. Therefore, in the information processing system according to the present embodiment, even when the external device 30 having a limited input and output interface is used, it is possible to present progress and a result of the process of switching a connection mode of the external device 30 to the user through the information processing device 10.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)
An information processing device including:
a control unit configured to, in a communication form in which a plurality of slave units are connected to one master unit through a wireless communication channel, instruct an external device to switch a mode from one mode to the other mode between a first mode in which an operation of the master unit is performed and a second mode in which an operation of the slave unit is performed; and
an acquisition unit configured to acquire information indicating a connection state between the external device and a connection destination of the external device according to switching of the mode.

(2)
The information processing device according to (1),
wherein the control unit instructs the external device to switch the mode via a first network that is established with the external device in advance, and
the acquisition unit acquires the information indicating the connection state from the external device via a second network that is different from the first network.

(3)
The information processing device according to (1),
wherein the acquisition unit extracts information that is transmitted and received between the external device and the connection destination from information transmitted through the wireless communication channel, and thus acquires the information indicating the connection state.

(4)
The information processing device according to (3),
wherein the acquisition unit acquires identification information for specifying the external device in advance, and extracts the information that is transmitted and received between the external device and the connection destination from the information transmitted through the wireless communication channel based on the acquired identification information.

(5)
The information processing device according to (4),
wherein the acquisition unit extracts the information that is transmitted and received between the external device and the connection destination from the information transmitted through the wireless communication channel based on the identification information and information indicating the connection destination stored in advance.

(6)
The information processing device according to any one of (1) to (5),
wherein the control unit instructs an external device that is connected in advance and operated in the first mode to switch a mode to the second mode and thus to be connected to the connection destination different from the information processing device, and
the acquisition unit acquires information indicating a connection state between the external device and the connection destination.

(7)
The information processing device according to any one of (1) to (6),
wherein the control unit transmits control information for the external device to connect to the connection destination to the external device according to switching of the mode.

(8)
The information processing device according to (7),
wherein the control information includes information indicating the connection destination.

(9)
The information processing device according to any one of (1) to (8),
wherein the control unit establishes communication with the connection destination and instructs the external device including an imaging unit to capture an image of a subject through the connection destination.

(10)
The information processing device according to (1),
wherein the control unit instructs the external device to connect to the information processing device according to switching of the mode through the connection destination, and the acquisition unit acquires the information indicating the connection state from the external device.

(11)

The information processing device according to (1), wherein the control unit instructs the external device that is connected in advance based on one mode between the first mode and the second mode to change to a connection based on the other mode, and the acquisition unit acquires the information indicating the connection state from the external device.

(12)

An information processing device including:

a control unit configured to, in a communication form in which a plurality of slave units are connected to one master unit through a wireless communication channel, switch a mode from one mode to the other mode between a first mode in which an operation of the master unit is performed and a second mode in which an operation of the slave unit is performed based on an instruction from an external device; and a notification unit configured to notify the external device of information indicating a connection state with a new connection destination according to switching of the mode.

(13)

The information processing device according to (12), wherein the control unit receives an instruction to switch the mode from the external device via a first network that is established in advance with the external device, and the notification unit notifies the external device of the information indicating the connection state via a second network that is different from the first network.

(14)

An information processing method including:

instructing, by a processor, in a communication form in which a plurality of slave units are connected to one master unit through a wireless communication channel, an external device to switch a mode from one mode to the other mode between a first mode in which an operation of the master unit is performed and a second mode in which an operation of the slave unit is performed; and acquiring information indicating a connection state between the external device and a connection destination of the external device according to switching of the mode.

(15)

An information processing method including:

switching, by a processor, in a communication form in which a plurality of slave units are connected to one master unit through a wireless communication channel, a mode from one mode to the other mode between a first mode in which an operation of the master unit is performed and a second mode in which an operation of the slave unit is performed based on an instruction from an external device; and notifying the external device of information indicating a connection state with a new connection destination according to switching of the mode.

(16)

A program causing a computer to execute:

instructing, in a communication form in which a plurality of slave units are connected to one master unit through a wireless communication channel, an external device to switch a mode from one mode to the other mode between a first mode in which an operation of the master unit is performed and a second mode in which an operation of the slave unit is performed; and acquiring information indicating a connection state between the external device and a connection destination of the external device according to switching of the mode.

(17)

A program causing a computer to execute:

switching, in a communication form in which a plurality of slave units are connected to one master unit through a wireless communication channel, a mode from one mode to the other mode between a first mode in which an operation of the master unit is performed and a second mode in which an operation of the slave unit is performed based on an instruction from an external device; and notifying the external device of information indicating a connection state with a new connection destination according to switching of the mode.

(18)

An information processing system including:

an information processing device; and an external device different from the information processing device, wherein the information processing device includes a first control unit configured to, in a communication form in which a plurality of slave units are connected to one master unit through a wireless communication channel, instruct the external device to switch a mode from one mode to the other mode between a first mode in which an operation of the master unit is performed and a second mode in which an operation of the slave unit is performed, and an acquisition unit configured to acquire information indicating a connection state between the external device and a connection destination of the external device according to switching of the mode, and the external device includes a second control unit configured to switch a mode from one mode to the other mode based on an instruction from the first control unit, and a notification unit configured to notify the information processing device of information indicating a connection state with a new connection destination according to switching of the mode.

REFERENCE SIGNS LIST 10 information processing device
101 control unit
103 communication unit
103a first communication unit
103b second communication unit
105 monitoring unit
107 UI
30, 30a to 30c external device
301 control unit
303 communication unit
303a first communication unit
303b second communication unit
90 communication device

The invention claimed is:

1. An information processing device comprising:

control circuitry configured to, in a communication form in which a plurality of slave units are connected to one master unit through a wireless communication channel, instruct an external device to mode switch between a first mode in which an operation of the master unit is performed and a second mode in which an operation of the slave unit is performed; and acquisition circuitry configured to acquire information indicating a connection state between the external device and a connection destination of the external device according to the mode switching, and to extract information that is transmitted and received between the external device and the connection destination from information transmitted through the wireless communication channel.

2. The information processing device according to claim 1,
wherein the control circuitry instructs the external device to mode switch via a first network that is established with the external device in advance, and
the acquisition circuitry acquires the information indicating the connection state from the external device via a second network that is different from the first network.

3. The information processing device according to claim 1,
wherein the acquisition circuitry acquires the information indicating the connection state as a result of the extracting.

4. The information processing device according to claim 3,
wherein the acquisition circuitry acquires identification information for specifying the external device in advance, and extracts the information that is transmitted and received between the external device and the connection destination from the information transmitted through the wireless communication channel based on the acquired identification information.

5. The information processing device according to claim 4,
wherein the acquisition circuitry extracts the information that is transmitted and received between the external device and the connection destination from the information transmitted through the wireless communication channel based on the identification information and information indicating the connection destination stored in advance.

6. The information processing device according to claim 1,
wherein the control circuitry instructs an external device that is connected in advance and operated in the first mode to mode switch to the second mode and thus to be connected to the connection destination different from the information processing device, and
the acquisition circuitry acquires information indicating a connection state between the external device and the connection destination.

7. The information processing device according to claim 1,
wherein the control circuitry transmits control information for the external device to connect to the connection destination to the external device according to the mode switching.

8. The information processing device according to claim 7,
wherein the control information includes information indicating the connection destination.

9. The information processing device according to claim 1,
wherein the control circuitry establishes communication with the connection destination and instructs the external device including an imaging unit to capture an image of a subject through the connection destination.

10. The information processing device according to claim 1,
wherein the control circuitry instructs the external device to connect to the information processing device according to the mode switching through the connection destination, and
the acquisition circuitry acquires the information indicating the connection state from the external device.

11. The information processing device according to claim 1,
wherein the control circuitry instructs the external device that is connected in advance based on one of the first mode and the second mode to change to a connection based on the other of the first mode and the second mode, and
the acquisition circuitry acquires the information indicating the connection state from the external device.

12. An information processing device comprising:
control circuitry configured to, in a communication form in which a plurality of slave units are connected to one master unit through a wireless communication channel, mode switch between a first mode in which an operation of the master unit is performed and a second mode in which an operation of the slave unit is performed based on an instruction from an external device via a first network that is established in advance with the external device; and
notification circuitry configured to notify the external device of information indicating a connection state with a new connection destination according to the mode switching via a second network that is based on a different communication method than the first network.

13. The information processing device according to claim 12,
wherein the control circuitry receives an instruction to mode switch from the external device via the first network.

14. An information processing method comprising:
instructing, by a processor, in a communication form in which a plurality of slave units are connected to one master unit through a wireless communication channel, an external device to mode switch between a first mode in which an operation of the master unit is performed and a second mode in which an operation of the slave unit is performed; and
acquiring information indicating a connection state between the external device and a connection destination of the external device according to the mode switching, and extracting information that is transmitted and received between the external device and the connection destination from information transmitted through the wireless communication channel.

15. An information processing method comprising:
mode switching, by a processor, in a communication form in which a plurality of slave units are connected to one master unit through a wireless communication channel, between a first mode in which an operation of the master unit is performed and a second mode in which an operation of the slave unit is performed based on an instruction from an external device via a first network that is established in advance with the external device; and
notifying the external device of information indicating a connection state with a new connection destination according to the mode switching via a second network that is based on a different communication method than the first network.

16. A non-transitory computer-readable medium storing instructions that, when executed by a processor of a computer, cause the computer to execute operations comprising:
 instructing, in a communication form in which a plurality of slave units are connected to one master unit through a wireless communication channel, an external device to mode switch between a first mode in which an operation of the master unit is performed and a second mode in which an operation of the slave unit is performed; and
 acquiring information indicating a connection state between the external device and a connection destination of the external device according to the mode switching, and extracting information that is transmitted and received between the external device and the connection destination from information transmitted through the wireless communication channel.

17. A non-transitory computer-readable medium storing instructions that, when executed by a processor of a computer, cause the computer to execute operations comprising:
 mode switching, in a communication form in which a plurality of slave units are connected to one master unit through a wireless communication channel, between a first mode in which an operation of the master unit is performed and a second mode in which an operation of the slave unit is performed based on an instruction from an external device via a first network that is established in advance with the external device; and
 notifying the external device of information indicating a connection state with a new connection destination according to the mode switching via a second network that is based on a different communication method than the first network.

* * * * *